(12) United States Patent
Tokuyama

(10) Patent No.: US 8,641,354 B2
(45) Date of Patent: Feb. 4, 2014

(54) IN-BUILDING STORAGE APPARATUS AND METHOD OF TAKING ARTICLE OUT OF THE SAME

(76) Inventor: Seo Tokuyama, Fukuoka (JP)

( * ) Notice: Subject to any disclaimer, the term of this patent is extended or adjusted under 35 U.S.C. 154(b) by 334 days.

(21) Appl. No.: 12/996,180

(22) PCT Filed: Jun. 5, 2009

(86) PCT No.: PCT/JP2009/002562
§ 371 (c)(1),
(2), (4) Date: Dec. 3, 2010

(87) PCT Pub. No.: WO2009/147868
PCT Pub. Date: Dec. 10, 2009

(65) Prior Publication Data
US 2011/0079165 A1    Apr. 7, 2011

(30) Foreign Application Priority Data
Jun. 5, 2008 (JP) ................. 2008-148469

(51) Int. Cl.
*B65G 1/04* (2006.01)
*E04H 6/18* (2006.01)
*E04H 6/22* (2006.01)
*E04H 6/24* (2006.01)

(52) U.S. Cl.
USPC ............................ 414/281; 414/282; 414/253

(58) Field of Classification Search
CPC .............. B65G 1/04; E04H 6/18; E04H 6/22; E04H 6/24
USPC ......... 414/227, 231, 232, 252, 253, 254, 255, 414/256, 261, 264, 266, 267, 268, 269, 270, 414/273, 277, 279, 281
See application file for complete search history.

(56) References Cited

U.S. PATENT DOCUMENTS 3,964,619 A * 6/1976 Irmler ........................ 414/281
4,966,513 A  10/1990 Motoda
(Continued)

FOREIGN PATENT DOCUMENTS

CN    1196770    10/1998
CN    2358157    1/2000
(Continued)

OTHER PUBLICATIONS

International Search Report issued Jul. 7, 2009 in International (PCT) Application No. PCT/JP2009/002562.

(Continued)

*Primary Examiner* — Saul Rodriguez
*Assistant Examiner* — Brendan Tighe
(74) *Attorney, Agent, or Firm* — Wenderoth, Lind & Ponack, L.L.P.

(57) ABSTRACT

The in-building storage apparatus includes a guide rail mounted in a storage space in which articles are stored, and making slidal movement in a direction perpendicular to a direction in which main rails extend, a platform car including a travelling section for running on the guide rail, and a lifting/lowering section which lifts or lowers an article, suspenders each of which suspends an article at such a height that the platform car can pass therebelow, and a control unit having functions of causing the guide rail to make slidal movement, causing the platform car to move along the guide rail, causing the lifting/lowering section to lift or lower for taking a target article out of the suspenders, and causing a target article to be suspended by the suspenders.

10 Claims, 28 Drawing Sheets

(56) References Cited

U.S. PATENT DOCUMENTS

| | | | | |
|---|---|---|---|---|
| 5,116,182 | A | * | 5/1992 | Lin .............................. 414/254 |
| 7,162,329 | B2 | * | 1/2007 | Dimitri et al. ................ 700/214 |

FOREIGN PATENT DOCUMENTS

| | | |
|---|---|---|
| CN | 1884013 | 12/2006 |
| EP | 0 412 805 | 2/1991 |
| GB | 1 408 674 | 10/1975 |
| JP | 56-176335 | 12/1981 |
| JP | 60-215974 | 10/1985 |
| JP | 4-269276 | 9/1992 |
| JP | 7-18910 | 1/1995 |
| JP | 7-48924 | 2/1995 |
| JP | 10-102808 | 4/1998 |
| JP | 2005-163451 | 6/2005 |
| WO | 97/48865 | 12/1997 |

OTHER PUBLICATIONS

Chinese Office Action issued Aug. 31, 2012 in corresponding Chinese Application No. 200980130671.7.

Chinese Office Action issued Mar. 25, 2013 in Chinese Patent Application No. 200980130671.7, together with English translation thereof.

European Search Report (ESR) completed Jan. 14, 2013 in European Patent Application No. EP 09 75 8135.

* cited by examiner

IN-BUILDING STORAGE APPARATUS AND METHOD OF TAKING ARTICLE OUT OF THE SAME

CROSS-REFERENCE TO RELATED APPLICATION

The present application is a National Stage of International Application No. PCT/JP2009/002562 which was filed on Jun. 5, 2009 and claims priority under 35 U.S.C. §119 from Japanese Patent Application No. 2008-148469 which was filed on Jun. 5, 2008, and the entire disclosure of which, including specification, claims, drawings and summary, is incorporated herein by reference in its entirety.

BACKGROUND OF THE INVENTION

1. Field of the Invention

The present invention relates to an in-building storage apparatus and a method of taking an article or articles out of the same, both of which make it possible to store articles in a storage space such as an attic and an underfloor.

2. Background Art

Since a room can have a limited space therein, there has been made an attempt in which an underfloor storage unit including a storage container is installed in an opening space below a floor equipped with a cover for opening and closing the opening space and for putting articles into the opening space therethrough or taking articles out of the opening space therethrough, in order to effectively make use of a dead space. However, since the underfloor storage unit is designed to merely have a storage container, a storage volume is limited to a volume capable of being stored in the storage container. Thus, there has been developed an in-building storage apparatus capable of increasing a storage volume by designing a plurality of storage containers to be selectively taken out. Such an in-building storage apparatus has been suggested in the patent references 1 to 3, for instance.

The underfloor storage apparatus suggested in the patent reference 1 comprises two rails formed in an underfloor space and extending in parallel with each other, a floor being partially open, a plurality of frames each having rollers so as to be able to move along the two rails independently of one another, a plurality of storage containers suspended on each of the frames, and a storage container mounted on an elevator.

The underfloor storage unit suggested in the patent reference 2 comprises rails extending to cover a position situated below a floor opening which is caused to be open or closed by means of a cover, a carriage designed to be able to controllably run on the rails, and include an elevator which can be controlled to move upwardly and downwardly, a storage case formed with a flange to be suspended, and L-shaped hanger pairs arranged at a suspending interval at a terminating end of a travelling path of the carriage, remote from the floor opening.

In the in-building storage unit suggested in the patent reference 3, when an article lying on a floor is stored into the unit, a container or an article is lowered through an entrance/exit onto a receiver unit of a carriage, and the carriage is driven to run in a path section. When the container reaches a target empty receiver, the receiver unit is operated for delivering the container to the empty receiver.

PATENT REFERENCES

Patent reference 1: Japan Utility Model Application Publication No. 56-176335

Patent reference 2: Japan Patent Application Publication No. 60-215974

Patent reference 3: Japan Patent Application Publication No. 7-48924

However, it is necessary for the underfloor storage apparatus suggested in the patent reference 1 to have a gap between the storage container rows suspended from the rails for taking a storage container lying on the elevator. For instance, in the case that a lot of storage containers are suspended from the rails, all of the storage containers suspended from the rails is subsequentially moved by holding a suspended storage container situated above the elevator and pushing the adjacent storage container. Consequently, if a lot of storage containers were suspended from the rails, since it is necessary to simultaneously move the storage containers, it would be a hard work for powerless workers.

In accordance with the underfloor storage unit suggested in the patent reference 2, it is able to increase a storage volume by designing the rails to be cross-shaped, circular or grid-shaped. However, if the rails were designed to be cross-shaped, the carriage has to perpendicularly turn at a corner. The patent reference 2 does not refer to a mechanism for the carriage to perpendicularly turn at a corner. In order for wheels driven by a motor to be able to perpendicularly turn at a corner, the carriage has to have a complex mechanism, but it is not easy.

In the in-building storage unit suggested in the patent reference 3, the carriage runs at a U-shaped path with all corners in straight angles formed between fixed storage shelves facing each other, in order to reach a target storage container. Accordingly, the carriage has to perpendicularly turn at a corner of a path, similarly to the carriage suggested in the patent reference 2. Thus, wheels of the carriage might be complex in structure.

In order for the driven wheels to have a relatively simple structure, it would be necessary to design the wheels not to perpendicularly turn, but to arcuately turn. In that case, it would be necessary to have a broad space for the paths.

SUMMARY OF THE INVENTION

In view of the above-mentioned problems, it is an object of the present invention to provide an in-building storage apparatus and a method of taking an article or articles out of the same, both of which makes it possible to readily bring articles into or take articles out of the in-building storage apparatus, even if a lot of articles were stored in the same, and further, for a platform car which carries articles to be able to move in any directions by virture of a simple structure.

The in-building storage apparatus in accordance with the present invention includes a guide rail mounted in a storage space in which articles are to be stored, and making sliding movement in a direction perpendicular to a direction in which main rails extend, a platform car including a travelling section through which the platform car runs on the guide rail, and a lifting/lowering section which lifts or lowers an article, suspenders each of which suspends an article at such a height that the platform car can pass below articles held by the suspenders at a storage position, and a control unit having functions of causing the guide rail to make sliding movement, causing the platform car to move along the guide rail, causing the lifting/lowering section to lift or lower for taking a target article out of the suspenders, and causing a target article to be suspended by the suspenders.

In the in-building storage apparatus in accordance with the present invention, the suspenders suspend and thus store articles in a storage space. The suspenders are designed to suspend articles at such a height that the platform car can pass below articles, and hence, articles can be stored. Even if paths along which the platform car travels were designed to include paths extending in a direction in which the guide rail makes sliding movement, and paths extending in a direction perpendicular to the direction in which the guide rail makes sliding movement, the platform car can perpendicularly turn at a corner by virtue of the operation of the control unit in which the control unit causes the guide rail to make sliding movement, and then, move the platform car along the guide rail. That is, since the guide rail and the platform car both make only linear movement, it is possible for the guide rail and the platform car to have a simple structure.

Furthermore, since the control unit causes the guide rail to make sliding movement and simultaneously the platform car to move along the guide rail when the platform car is directed to a target article, it is possible for the platform car with no articles loaded thereon to move to a target article, passing below articles already stored in the suspenders. That is, the platform car is able to move to a target position at which a target article is stored from an initial position, passing below articles without making a long detour regardless of how much articles are stored. Accordingly, it is not necessary for a user to work, because the platform car takes a target article among a lot of articles stored, and further, the platform car is able to move to and take out a target article at a short distance.

It is preferable that the control unit has a function of causing the platform car to linearly move to a target position from an initial position by causing the platform car to move while the guide rail is caused to make sliding movement. Since the platform car can move to a target position at a minimum distance by linearly moving to the target position from an initial position, it would be possible to take out a target article in a minimum period of time.

It is preferable that the suspenders are arranged in a plurality of rows to define paths on which the platform car can travel between adjacent rows of the suspenders with an article being mounted on the lifting/lowering section.

The suspenders are arranged in a plurality of rows to define paths on which the platform car can travel with an article being mounted on the lifting/lowering section. Therefore, when a target article is taken out, the platform car can diagonally travels to a target article below the rows of articles, load a suspended article thereon, and travel on the paths to an exit.

It is preferable that each of the suspenders includes a pair of vertical sections spaced away from each other by a space longer than a maximum width of an article, and holding sections each formed with each of the vertical sections, and inwardly extending to be spaced away from each other by a space shorter than the maximum width of an article for holding the article therewith.

When the platform car suspends an article on the suspenders, the lifting/lowering section on which an article is loaded is elevated into a pair of the vertical sections. Then, the lifting/lowering section is lowered to thereby cause an article to be held by the holding sections. In this way, an article can be suspended on the suspenders.

It is perferable that the in-building storage apparatus further includes a lift unit including a pair of horizontal sections spaced away from each other by a space to allow an article mounted on the platform car to travel thereinto, for holding the article thereon, and a lift section for lifting and lowering the horizontal sections to carry an article to an entrance/exit.

By designing the in-building storage apparatus to further include the lift unit, an article can be readily taken out of an exit.

It is perferable that the in-building storage apparatus further includes a second guide rail which makes sliding movement relative to the guide rail to form a line with the guide rail. The control unit causes at least one of the guide rail and the second guide rail to make sliding movement to allow the platform car to run between the guide rail and the second guide rail arranged to form a line.

It is possible to bring articles into or take articles out of a storage space, even it is broad, by designing the control unit to cause one or both of the guide rail and the second guide rail to make sliding movement to allow the platform car to run between the guide rail and the second guide rail arranged to form a line.

It is preferable that the in-building storage apparatus further includes a relay rail to connect the guide rail and the second guide rail both making sliding movement to each other to define a linear rail to allow the platform car to run thereon. Even if a storage space were broad, and hence, it were necessary to stand pillars to support a ceiling of the storage space, it would be possible to stand pillars without interfering with sliding movement of the guide rail, by arranging the relay rail between the guide rails to allow the platform car to run thereon.

It is preferable that the control unit has a function of causing at least three guide rails, arranged such that they make sliding movement in parallel with one another, to make sliding movement to form a line, and causing the platform car to travel from a guide rail disposed at an end to a guide rail disposed at the other end. The control unit arranges the guide rails in a line, when the platform car used in the in-building storage apparatus in accordance with the present invention is caused to move to a guide rail situated at one end to a guide rail situated at the other end. By so arranging the guide rails, the platform car is able to run to the other end from one end without decelerating or stopping for transferring to a guide rail from another guide rail.

A method relates to taking an article out of an in-building storage apparatus including a guide rail, a platform car, and suspenders, in accordance with the present invention. Each of the suspenders suspends an article at such a height that the platform car for carrying an article can pass below articles, the guide rail is disposed below a storage space in which the suspenders are disposed, and make sliding movement in a direction perpendicular to a direction in which main rails extend. The platform car includes a travelling section through which the platform car runs on the guide rail, and a lifting/lowering section which lifts or lowers an article. The method includes the steps of causing the platform car to pass below other articles to move from an initial position to a target position, that is, a position situated below a target article by moving the platform to a position situated below the target article while the guide rail is being moved to a position situated below the target article, lifting the platform car for taking the target article out of the suspenders, and moving the platform car and causing the guide rail to make sliding movement for causing the platform car to leave the suspenders out of which the target article was taken and further for heading the platform car to an exit.

The method of taking an article out of an in-building storage apparatus, in accordance with the present invention, makes it possible for the platform car to move below articles to a target position at which a target article is stored from an initial position without making a long detour regardless of how many articles are stored. Accordingly, it is not necessary for a user to work, because the platform car takes a target article among a lot of articles stored, and further, the platform car is able to move to and take out a target article at a short distance.

It is preferable that the platform car is caused to linearly move to a target position from an initial position. Since the platform car is able to move to a target position at a minimum distance by linearly moving to the target position from an initial position, it would be possible to take out a target article in a minimum period of time.

The advantages obtained by the aforementioned present invention will be described hereinbelow.

The present invention makes it not necessary for a user to work, because the platform car takes a target article among a lot of articles stored, and further, makes it possible for the platform car to move to and take out a target article at a short distance, ensuring that it is possible to readily bring articles into or take articles out of the in-building storage apparatus, even if the in-building storage apparatus stores a lot of articles therein. In addition, in the present invention, since the guide rail and the platform car both make only linear movement, it is possible for the guide rail and the platform car to have a simple structure.

The above and other objects and advantageous features of the present invention will be made apparent from the following description made with reference to the accompanying drawings, in which like reference characters designate the same or similar parts throughout the drawings.

DETAILED DESCRIPTION OF THE INVENTION

First Embodiment

Figure 1:
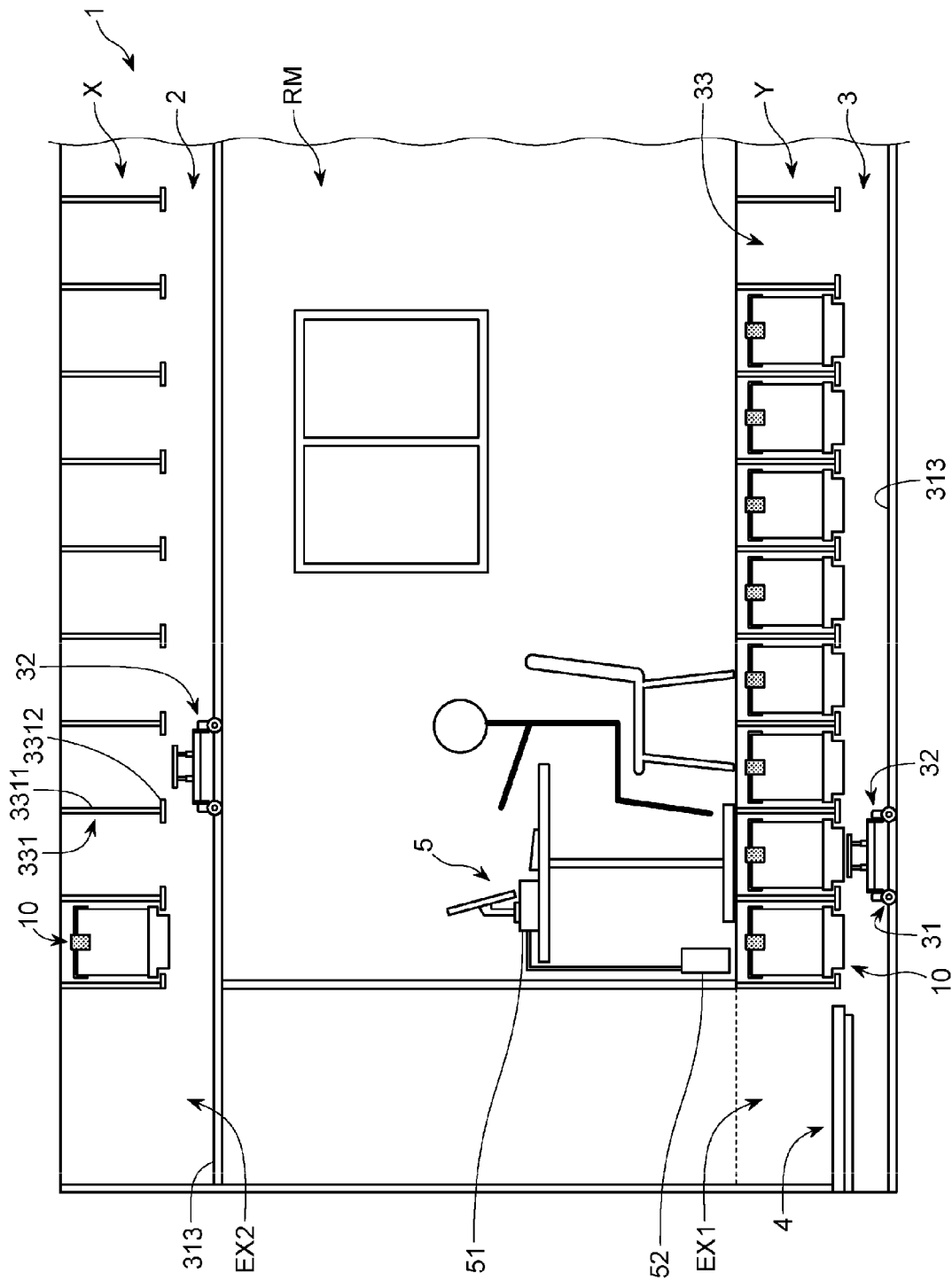
FIG. 1 is a cross-sectional view of the in-building storage apparatus in accordance with the first embodiment of the present invention.
Figure 2:
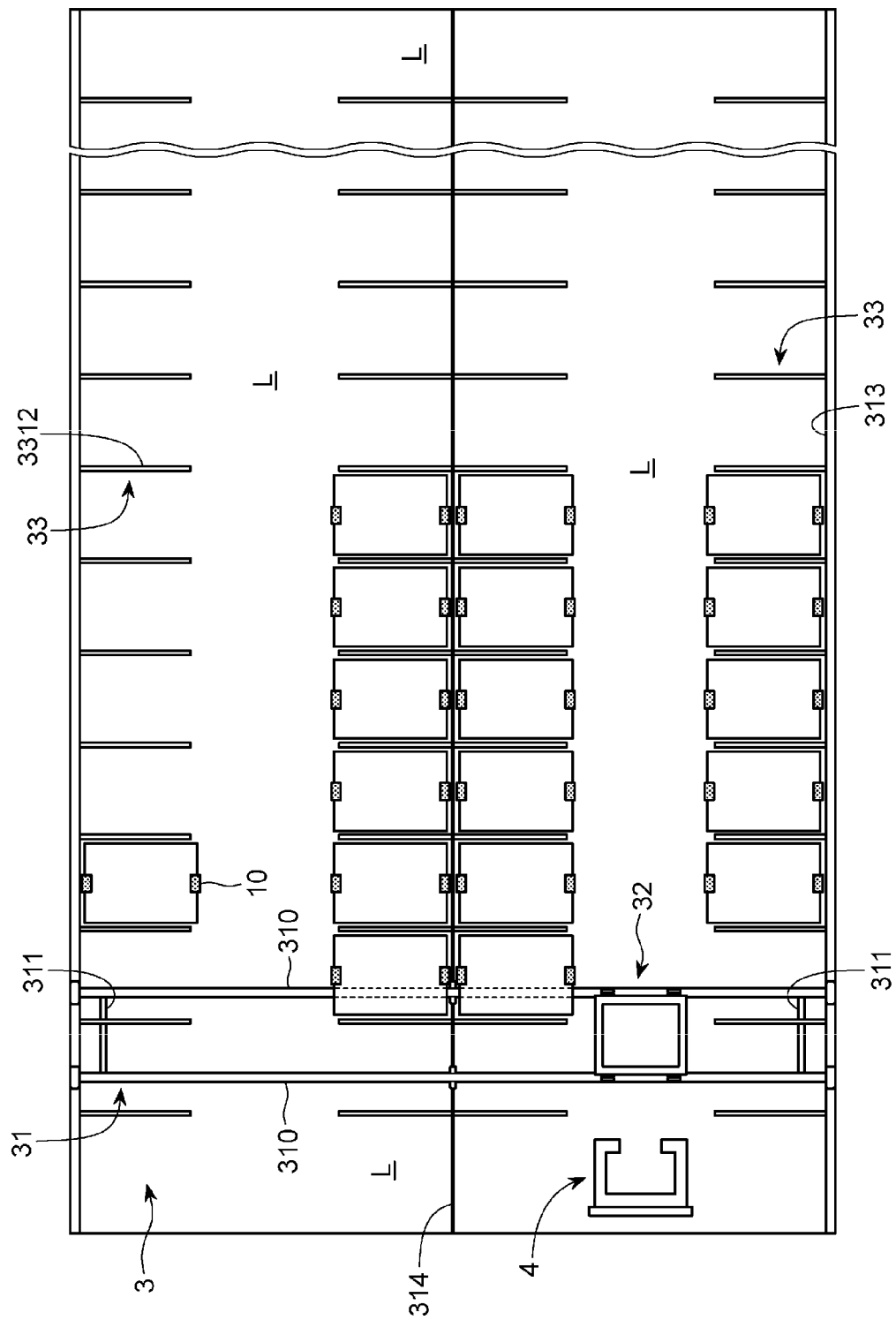
FIG. 2 is a plan view of the underfloor storage apparatus which is a part of the in-building storage apparatus illustrated in FIG. 1.
Figure 3:
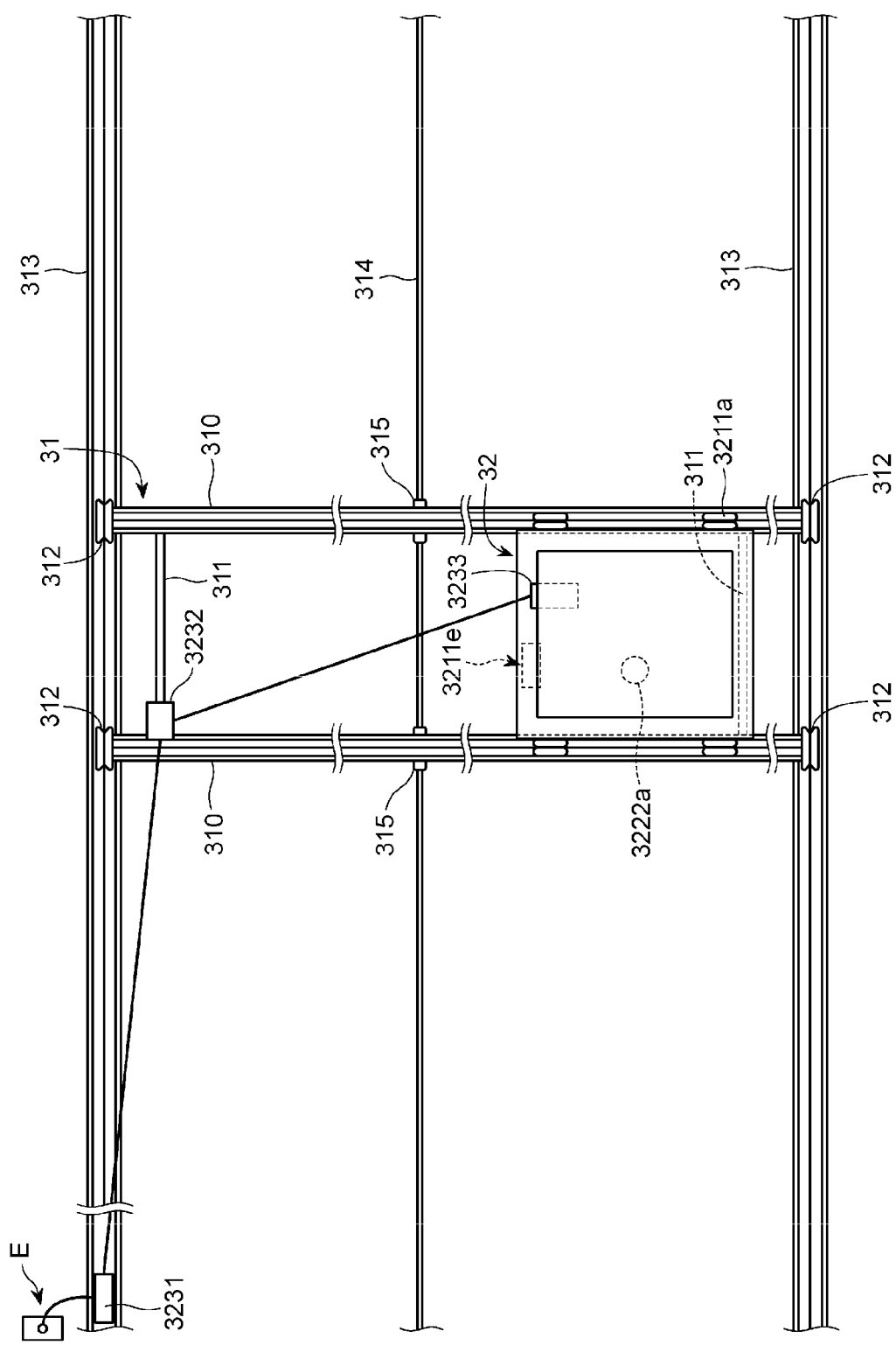
FIG. 3 illustrates the guide rail and the platform car.
Figure 4:
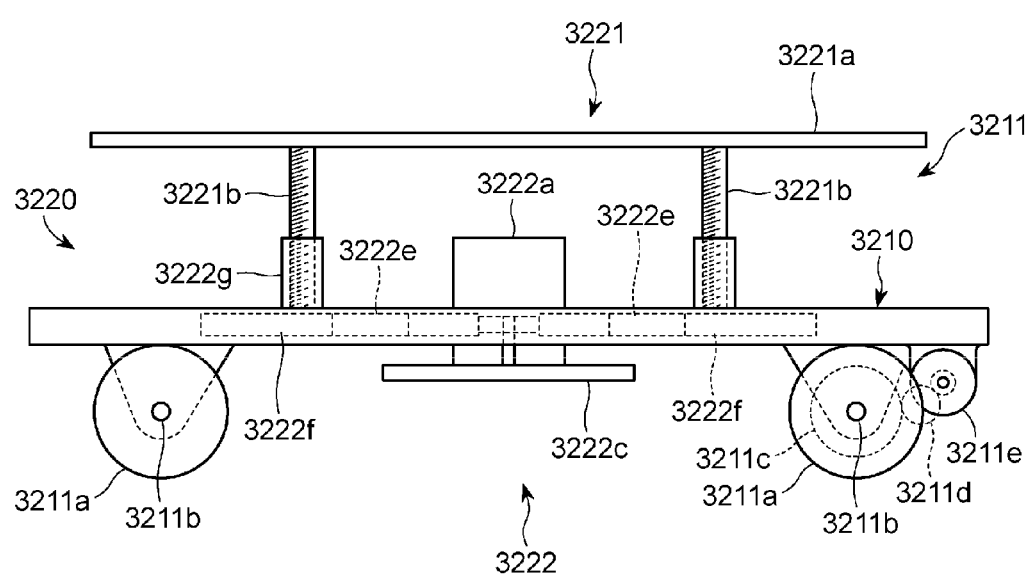
FIG. 4 is a side view of the platform car.
Figure 5:
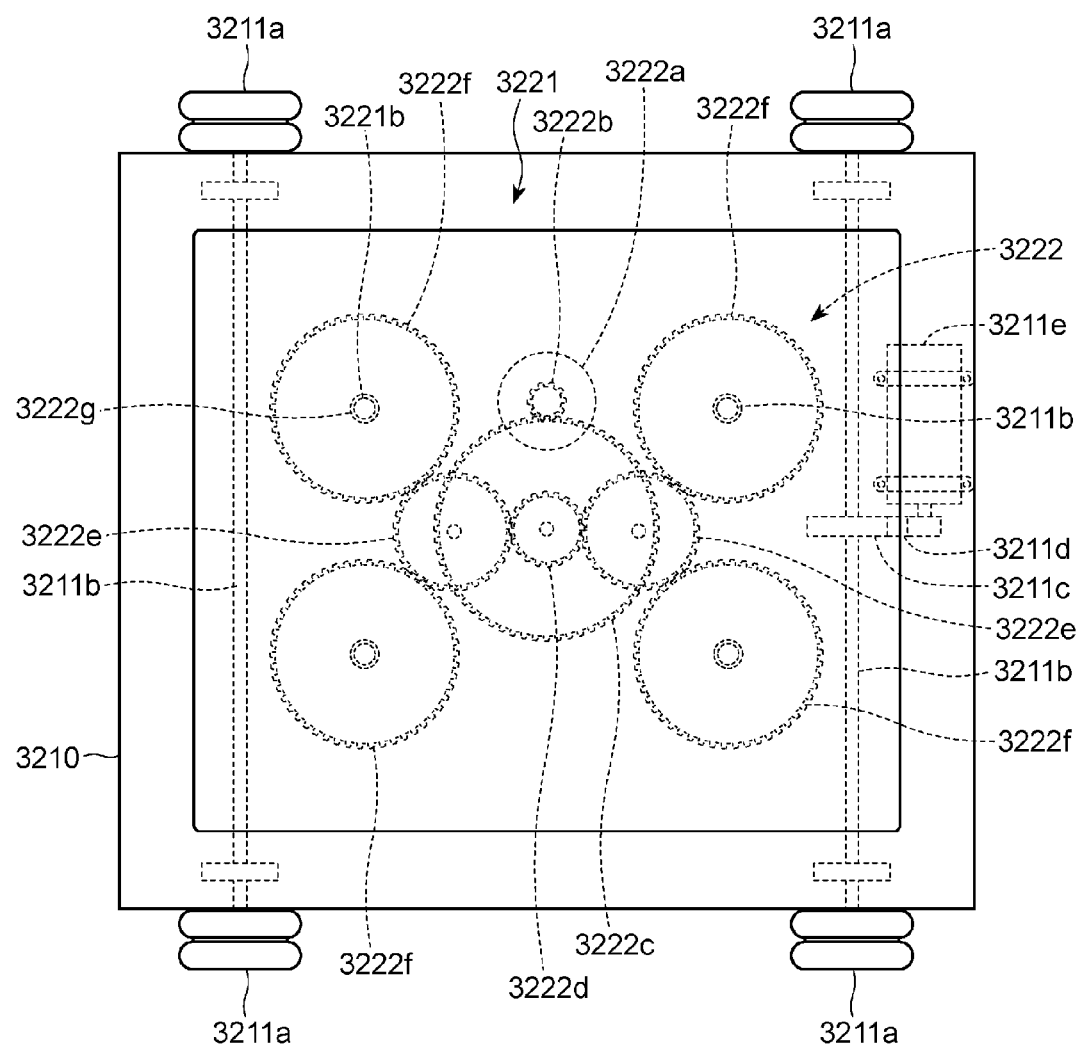
FIG. 5 is a plan view of the platform car.
Figure 6A:
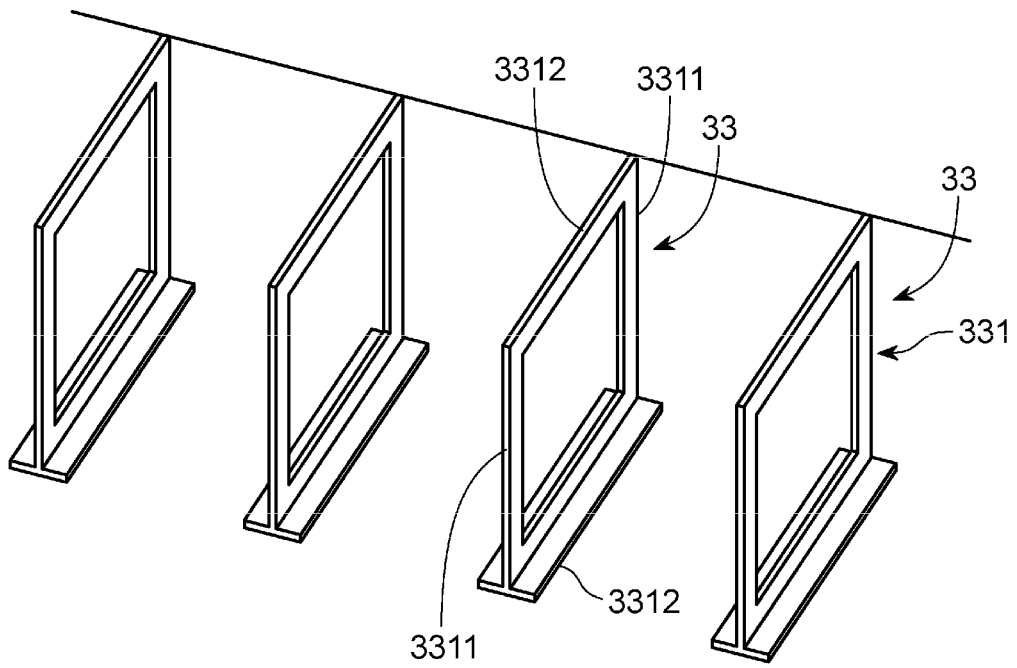
FIG. 6A is a perspective view of the suspenders.
Figure 6B:
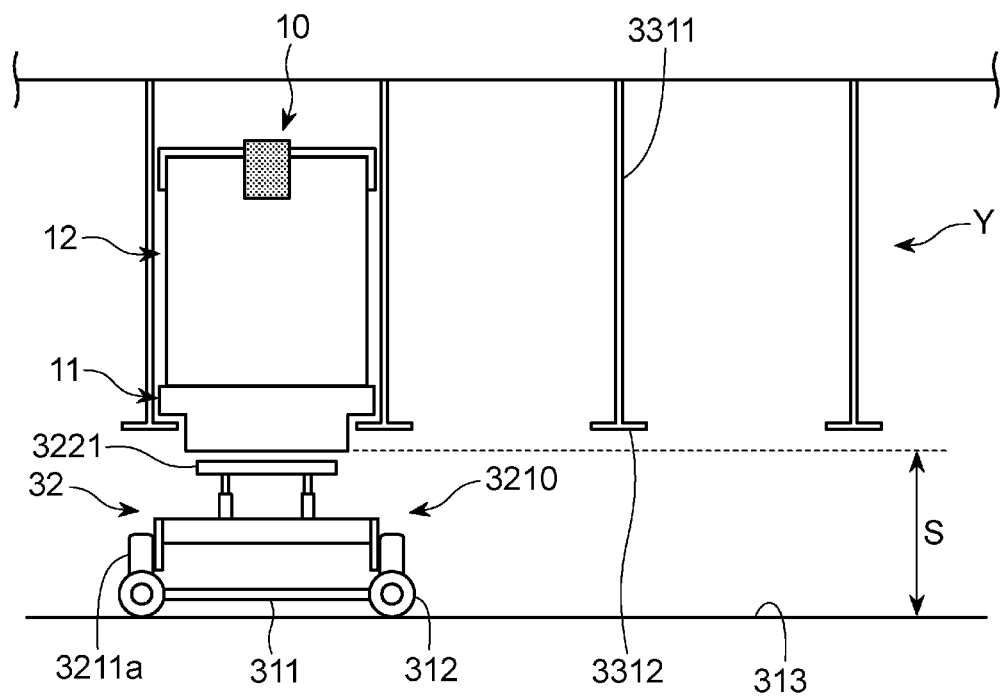
FIG. 6B shows a positional relation between the suspenders and the platform car.
Figure 7:
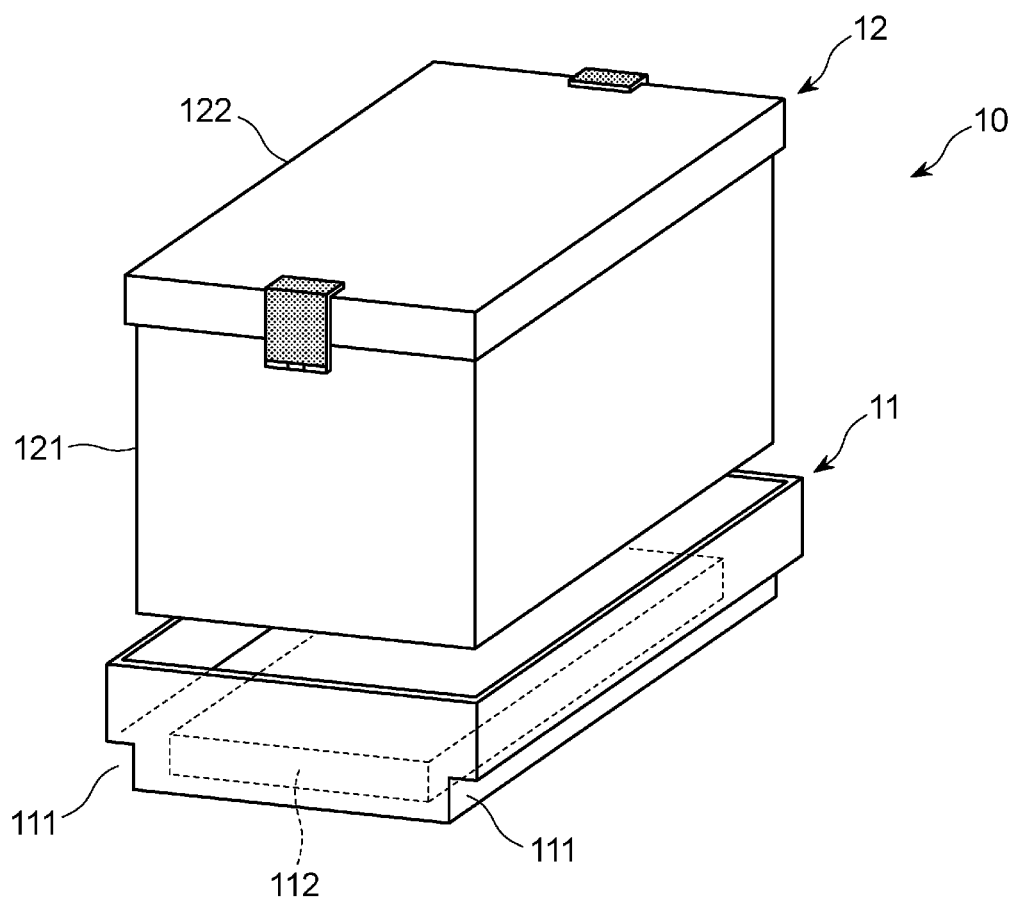
FIG. 7 is a perspective view of the storage container.
Figure 8:
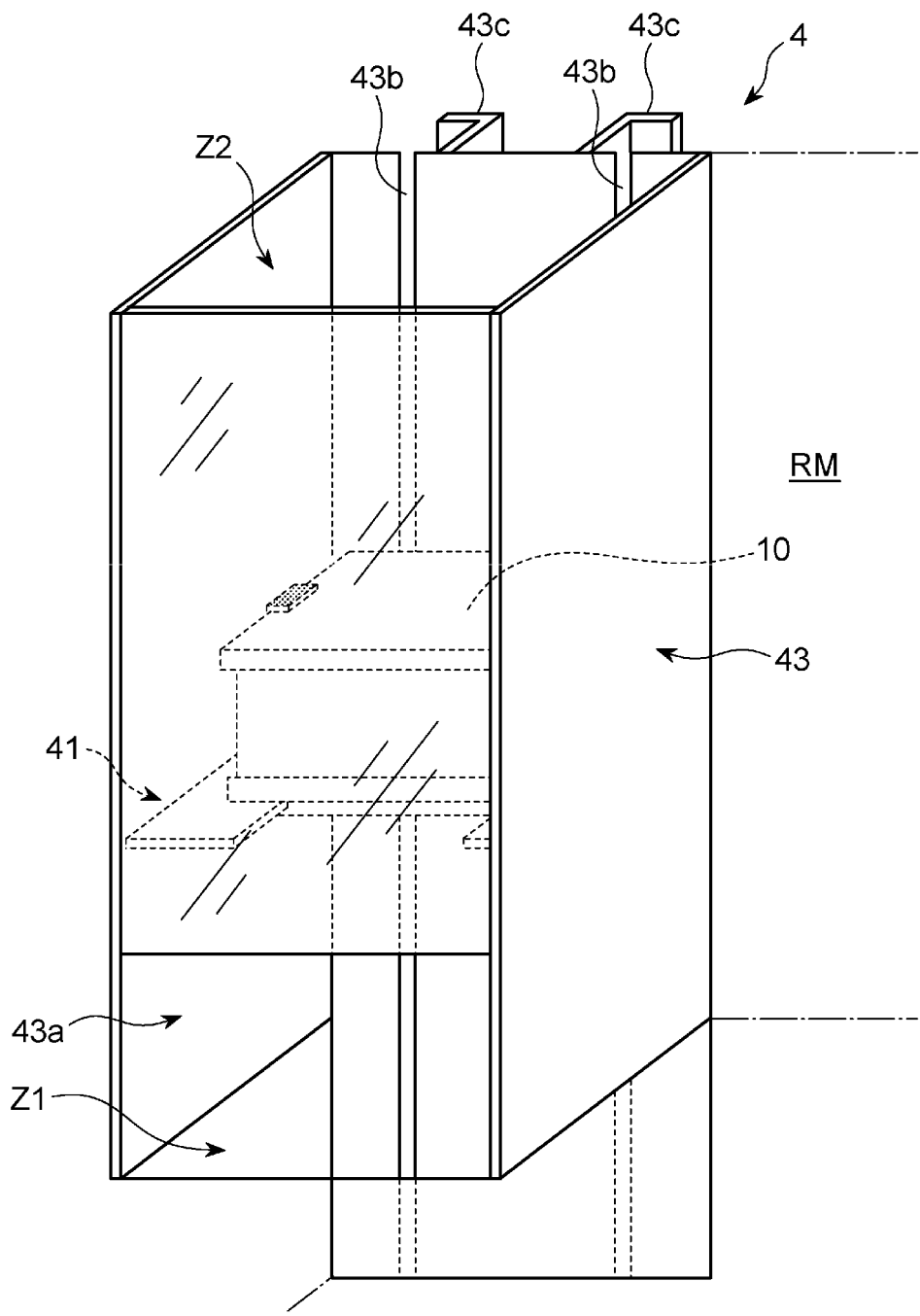
FIG. 8 is a perspective view of the lift unit.
Figure 9:
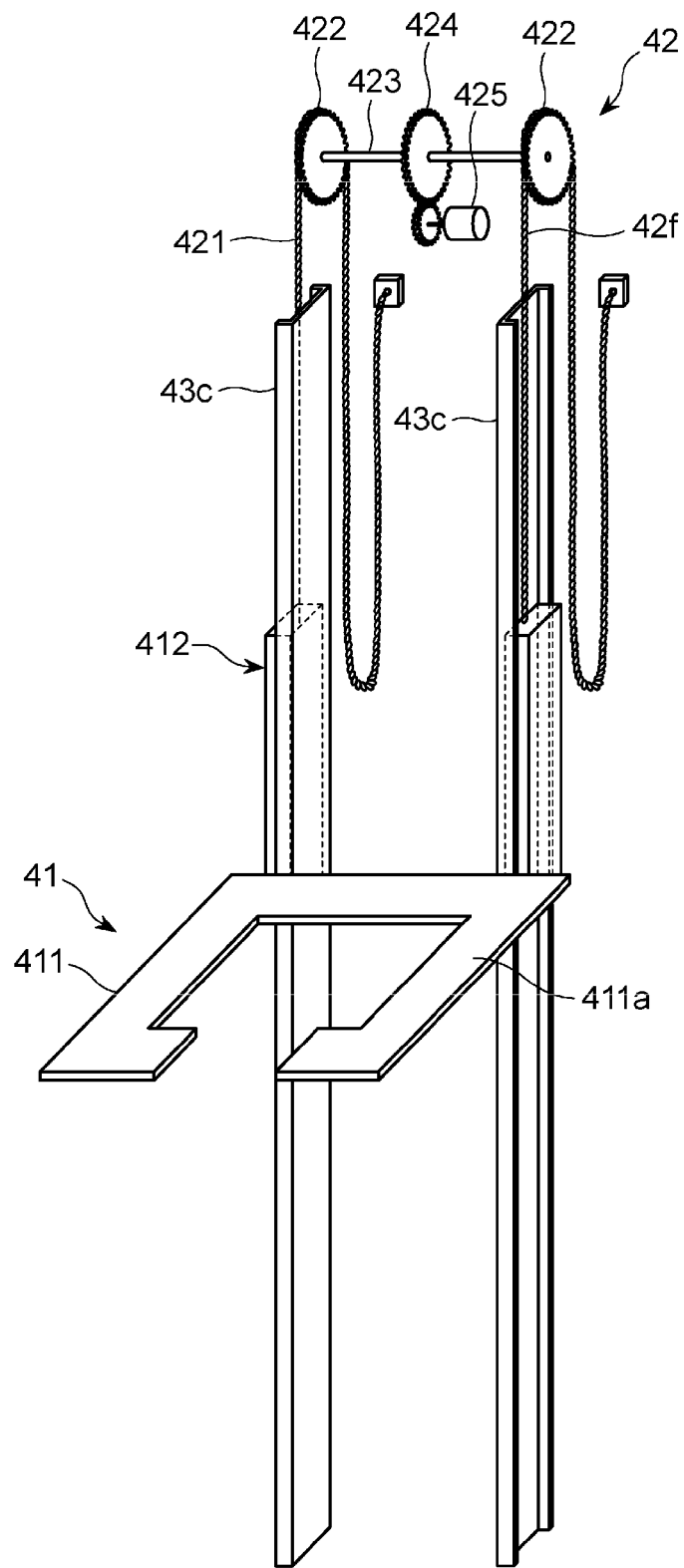
FIG. 9 illustrates a mechanism for driving the lift unit.
Figure 10:
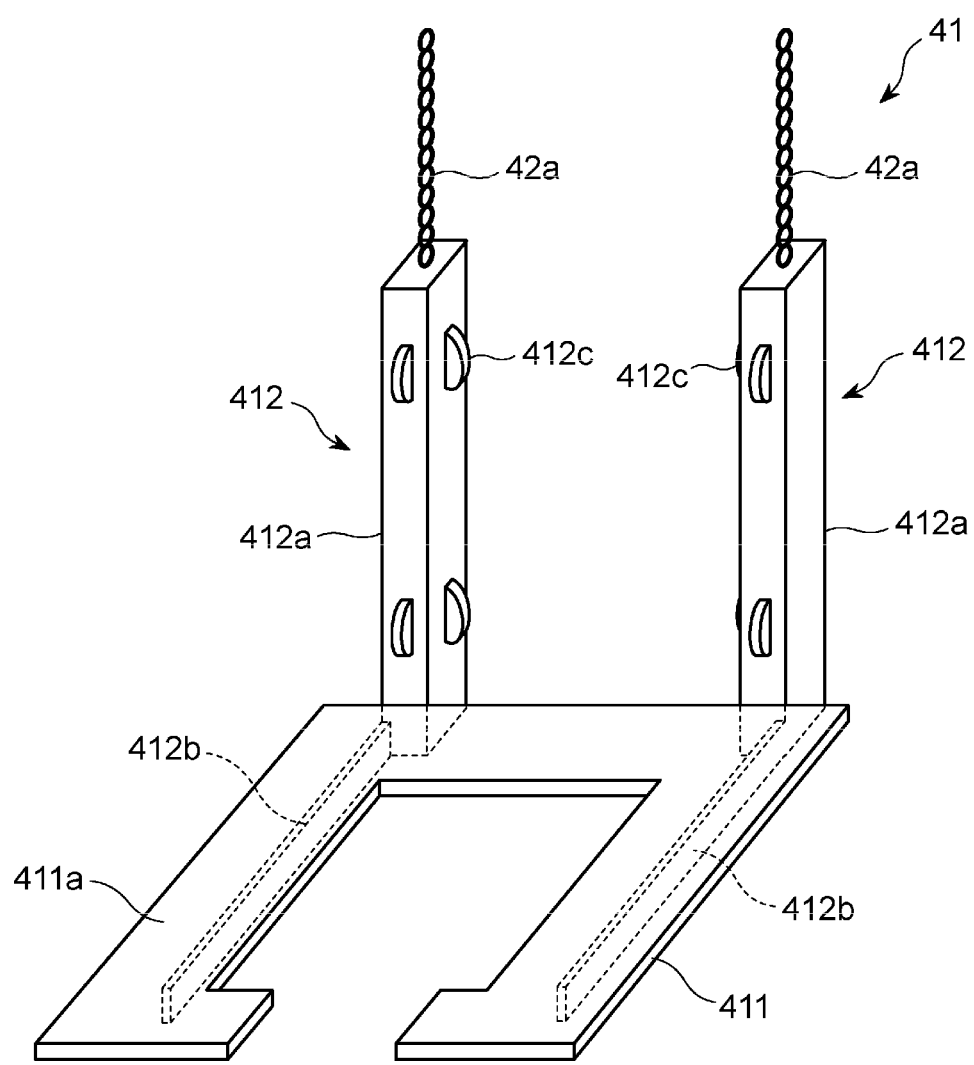
FIG. 10 is a perspective view of a stage of the lift unit.
Figure 11:
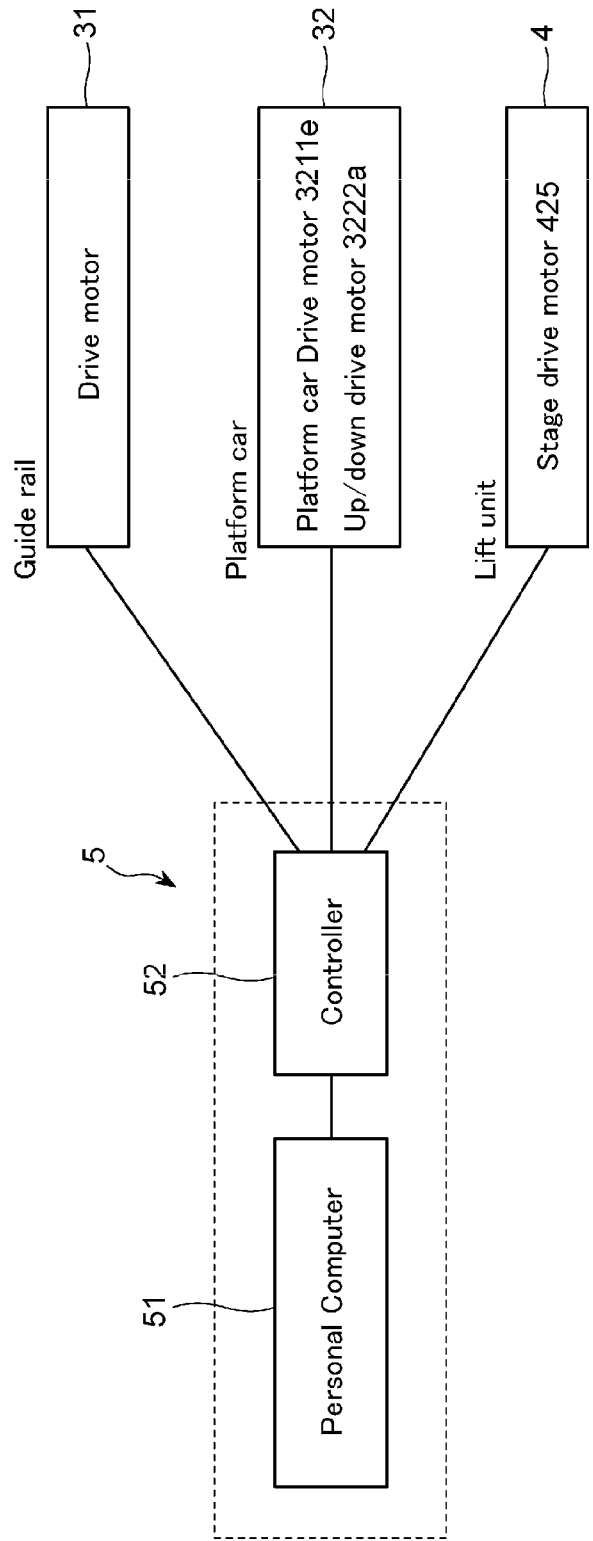
FIG. 11 is a block diagram of the control unit.
Figure 12:
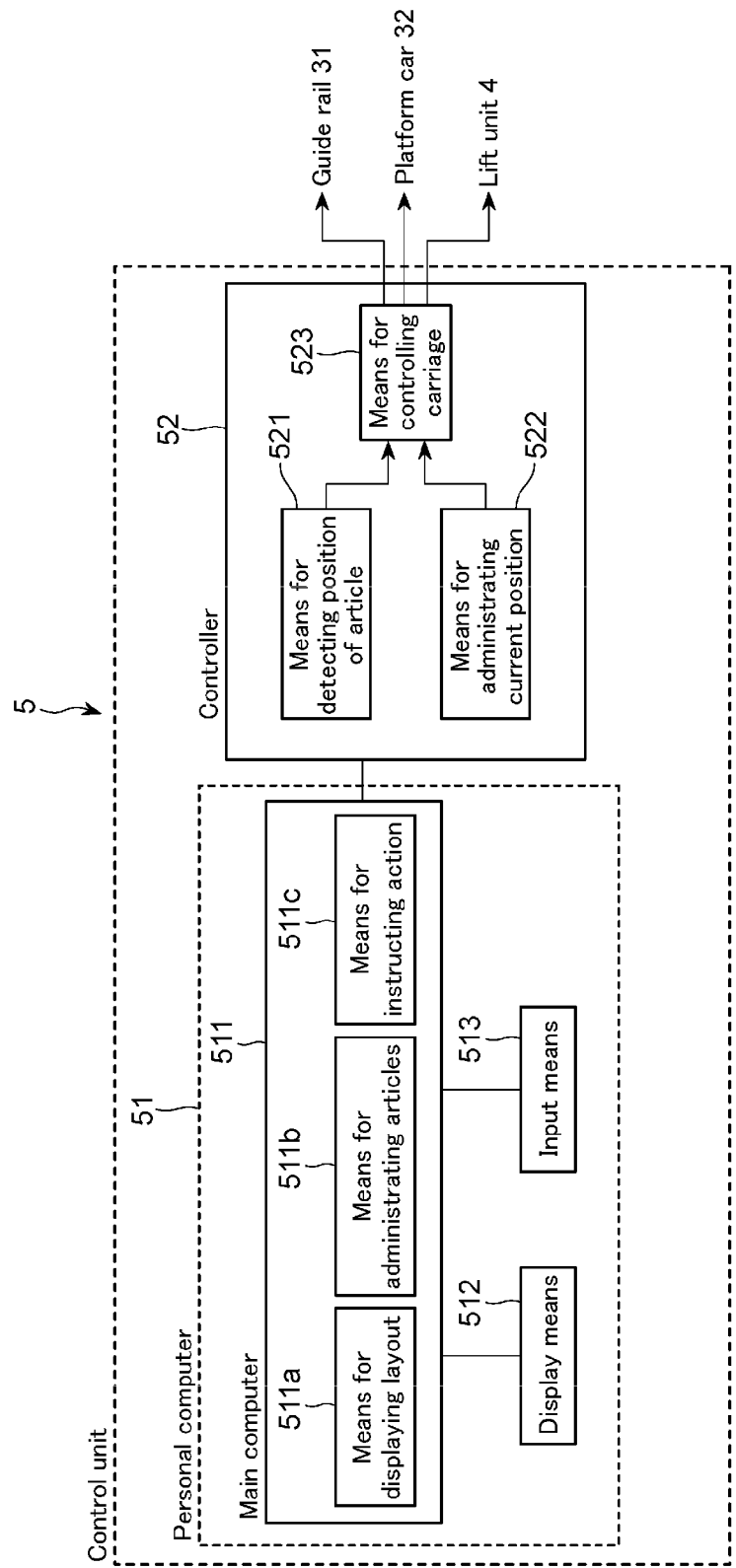
FIG. 12 is a block diagram of the personal computer and the controller.

The in-building storage apparatus in accordance with the first embodiment is explained hereinbelow with reference to the drawings. First, a structure of the in-building storage apparatus is explained with reference to FIGS. 1 to 12. FIG. 1 is a cross-sectional view of the in-building storage apparatus in accordance with the first embodiment of the present invention. FIG. 2 is a plan view of the underfloor storage apparatus which is a part of the in-building storage apparatus illustrated in FIG. 1. FIG. 3 illustrates the guide rail and the platform car. FIG. 4 is a side view of the platform car. FIG. 5 is a plan view of the platform car. FIG. 6A is a perspective view of the suspenders. FIG. 6B shows a positional relation between the suspenders and the platform car. FIG. 7 is a perspective view of the storage container. FIG. 8 is a perspective view of the lift unit. FIG. 9 illustrates a mechanism for driving the lift unit. FIG. 10 is a perspective view of a stage of the lift unit. FIG. 11 is a block diagram of the control unit. FIG. 12 is a block diagram of the personal computer and the controller.

As illustrated in FIGS. 1 and 2, the in-building storage apparatus 1 in accordance with the first embodiment brings articles 10 into and takes articles 10 out of an attic X and/or an underfloor Y both acting as a storage space, and moves the articles 10 between the attic X and the underfloor Y. The in-building storage apparatus 1 includes an attic storage unit 2 formed in the attic X, an underfloor storage unit 3 formed in the underfloor Y, a lift unit 4 moving the articles 10 between the attic storage unit 2 and the underfloor storage unit 3, and a control unit 5 controlling the attic storage unit 2, the underfloor storage unit 3, and the lift unit 4. The attic storage unit 2 and the underfloor storage unit 3 are different from each other only in the places in which they are formed (i.e., their locations), but are identical in structure to each other. Accordingly, only the underfloor storage unit 3 is explained hereinbelow in the first embodiment, and the detailed explanation of the attic storage unit 2 is omitted.

The underfloor storage unit 3 includes a guide rail 31, a platform car 32, and suspenders 33. Articles 10 each comprising a tray 11 acting as a storage unit, and a storage container 12 lying on the tray 11 are brought into and taken out of the underfloor storage unit 3 through an entrance/exit EX1. The articles 10 are arranged in four rows in a longitudinal direction of the underfloor Y such that the central two rows and each of the rows situated in contact with walls define paths L therebetween for the platform car 32 to pass. Furthermore, spaces situated outside opposite ends of the rows of the suspenders 33 also define paths L.

As illustrated in FIG. 3, the guide rail 31 includes a pair of main rails 310 each having a substantially triangular cross-section and arranged in parallel with each other, and connection frames 311 for causing the main rails 310 to be spaced from each other by a predetermined distance in order to keep the main rails 310 in parallel with each other. Each of the main rails 310 is designed to have wheels 312 at opposite ends thereof, which are driven by a drive motor (not illustrated). The wheels 312 of the guide rail 31 run on travel paths 313 extending at opposite ends of the underfloor Y. Thus, the guide rail 31 makes sliding movement along path 313 in a direction perpendicular to a longitudinal axis of the main rails 310. Since the wheels 312 linearly move along the linearly extending travel paths 313, it is not necessary for the guide rail 31 to include a pivot for turning a direction in which the wheels 312 move relative to the main rails 310.

Furthermore, in order to prevent the main rails 310 from downwardly deflecting at a central portion thereof, each of the main rails 310 is designed at a central portion thereof to have a center wheel 315 running on a central travel path 314 extending at a middle of the underfloor Y. Though the first embodiment is designed to include the central travel path 314, if the main rails 310 were not deflected with a weight of the articles 10, it is possible to omit the central travel path 314, and the center wheels 315 running on the central travel path 314.

The platform car 32 moves along the guide rail 31 to thereby carry the article 10. Hereinbelow is explained the platform car 32 in detail with reference to FIGS. 4 and 5.

As illustrated in FIGS. 4 and 5, the platform car 32 includes a main frame 3210 which is rectangular when viewed vertically, and a lifting/lowering section 3220 mounted on the main frame 3210.

The main frame 3210 includes a traveling section 3211, which comprises wheel shafts 3211b situated at a front and a rear and having wheels 3211a at opposite ends thereof, and a platform car drive motor 3211e for driving a shaft gear 3211c fixed to a central portion of one of the wheel shafts 3211b, through a transfer gear 3211d. The platform car drive motor 3211e rotates in either a forward direction or a reverse direction in accordance with an instruction received from the control unit 5, to thereby move on the guide rail 31.

The lifting/lowering section 3220 includes a platform 3221 on which the article 10 is put, and a lifting/lowering driving section 3222 for upwardly and downwardly moving the platform 3221. The platform 3221 includes a plate 3221a which is rectangular when viewed vertically, and pillar-shaped supports 3221b extending perpendicularly and downwardly from a lower surface of the plate 3221a. The platform 3221 is broad enough for the tray 11 to be stably put thereon. Furthermore, the platform 3221 is designed to have such a width that the platform 3221 is able to elevate and lower between horizontal members of a frame (later explained in detail) of the suspender 33. Further, the platform 3221 has such a length that the platform 3221 is able to elevate and lower between arms of a U-shaped table (later explained in detail) of the lift unit 4. The supports 3221b are formed at outer surfaces thereof with a male thread.

The lifting/lowering driving section 3222 includes an up/down drive motor 3222a, a drive transfer gear 3222b fixed to a drive shaft of the up/down drive motor 3222a, a larger-diameter gear 3222c rotated by the drive transfer gear 3222b, a smaller-diameter gear 3222d coaxial with the larger-diameter gear 3222c, two first relay gears 3222e sandwiching the smaller-diameter gear 3222d therebetween in a front-rear direction, and four second relay gears 3222f each in mesh with one of the first relay gears 3222e. Each of the second relay gears 3222f is coaxially formed with a cylindrical platform holder 3222g having an inner surface formed with female thread which is in mesh with the male thread formed at an outer surface of each of the supports 3221b.

Electric power may be supplied to the guide rail 31 and the platform car 32 through a winding-up cord reel used in a domestic cleaner, for instance. As illustrated in FIG. 3, a box 3231 electrically connected to a domestic plug socket E is connected to a first cord reel 3232 mounted on the guide rail 31. The first cord reel 3232 supplies electric power to a drive motor which drives the guide rail 31, and is electrically connected to a second cord reel 3233 mounted on the platform car 32. The second cord reel 3233 supplies electric power to the platform car drive motor 3211e and the up/down drive motor 3222a of the platform car 32.

As illustrated in FIGS. 6A and 6B, each of the suspenders 33 suspends and thus holds the article 10 in the underfloor Y. The suspenders 33 comprise a plurality of rectangular frames 331 spaced away from adjacent ones by a predetermined distance. Each of the frames 331 is comprised of a pair of vertical members 3311, and a pair of horizontal members 3312. Among the suspenders 33 arranged in four rows, each of the suspenders 33 in two rows located at opposite ends is fixed to a wall through the vertical member 3311, and to a ceiling of the underfloor through the horizontal member 3312. Each of the suspenders 33 in centrally located two rows is fixed to a ceiling of the underfloor through the horizontal member 3312. The vertical members 3311 each acting as a vertical section are spaced away from one another by a distance greater than a maximum width of the article 10. Each of the horizontal members 3312 formed at a lower end of each of the vertical members 3311 and acting as a holding section is designed to horizontally protrude to opposite sides to thereby define a T-shape together with the vertical members 3311, such that the horizontal members 3312 are spaced apart from one another by a distance smaller than a maximum width of the tray.

Below the suspenders 33 by which the articles 10 are suspended, there is formed a space S in which the platform car 32 moving on the guide rail 31 which makes sliding movement is able to pass.

Hereinbelow is explained the article 10 with reference to FIG. 7. The article 10 comprises a tray 11 acting as a storage unit, and a storage container 12 in which goods are stored. The tray 11 is formed with a recess 111 linearly extending in a longitudinal direction of a bottom thereof. Furthermore, the tray 11 is formed at a bottom thereof with a rectangular recess 112 into which the plate 3221a of the elevating platform 3221 is fit. The tray 11 has a width greater than a distance by which the horizontal members 3312 are spaced away from one another, in order for the tray 11 to be able to be held by the suspenders 33. The tray 11 has a length greater than a distance by which the arms of the U-shaped table are spaced away from each other.

The storage container 12 includes a box 121 which is upwardly open, and a cover 122 covering an opening of the box 121 therewith. Goods are stored in the storage container 12. Though goods are stored in the storage container 12 in the first embodiment, goods may be put directly on the tray 11, if the goods are not fallen from the tray 11 when the platform car 32 on which the tray 11 lies moves.

Hereinbelow is explained the lift unit 4 with reference to FIGS. 8 to 10. The lift unit 4 includes a stage 41 upwardly and downwardly movable with the article 10 being put thereon, a driver 42 for elevating and lowering the stage 41, and an elevation path 43 which guides the stage 41, and acts as a cover for preventing the article 10 from dropping when the article 10 moves in a room RM.

The stage 41 includes a table 411 on which the article 10 is put, and table supports 412 for stably elevating and lowering the table 411.

The table 411 is substantially U-shaped, and front ends thereof inwardly protrude. The U-shaped table 411 has arms 411a spaced away from each other such that the arms are located at opposite ends of the tray 11 in a longitudinal direction of the tray 11.

Each of the table supports 412 is comprised of a vertical section 412a and a horizontal section 412b, and is L-shaped in its entirety. The vertical section 412a is formed with wheels 412c for upwardly and downwardly moving along slits 43b formed with the elevation path 43.

As illustrated in FIG. 9, the driver 42 includes chains 421 each connected at one end to each of the table supports 412, chain wheels 422 each rotating to thereby act as a fixed pulley which upwardly and downwardly moves the stage 41 through the chains 421, a drive gear 424 connected to the chain wheels 422 through a shaft 423, and a stage drive motor 425 for rotating the drive gear 424. Each of the chains 421 has such a length that the stage 41 is able to upwardly and downwardly move between the underfloor Y and the attic X, and is fixed at the other end to a wall.

As illustrated in FIG. 8, the elevation path 43 has an opening leading to both an entrance/exit EX1 of the underfloor Y and an entrance/exit EX2 of the attic X, and is cylindrical in shape with a rectangular horizontal cross-section. The elevation path 43 is formed at a front thereof and a lower portion thereof with an opening 43a through which the article 10 is brought into and taken out of the lift unit 4. The opening 43a may be closed with a door for safety. The elevation path 43 is formed at a rear with slits 43b, and further formed along the slits 43b with elevation rails 43c each having a U-shaped cross-section. The vertical sections 412a of the stage 41 are guided by the elevation rails 43c when the lift unit moves upwardly and downwardly. Thus, the stage 41 is able to stably upwardly and downwardly move without horizontal deviation.

The stage 41 is designed to be located at such a height that the stage 41 is located between the plate 3221a and the main frame 3210 when the platform 3221 is elevated for delivering the article 10 to the platform car 32.

As illustrated in FIGS. 1 and 11, the control unit 5 includes a personal computer 51 and a controller 52 both situated in a room RM, and electrically connected to each other through a USB (Universal Serial Bus). The controller 52 is designed to be able to communicate with the guide rail 31, the platform car 32, and the lift unit 4. The controller 52, the guide rail 31, the platform car 32 and the lift unit 4 are designed in the first embodiment to be electrically connected to one another through wires, but they may be designed to be able to make radio-communication with one another.

As illustrated in FIG. 12, the personal computer 51 comprises a main computer 511, a display means 512, and an input means 513, both of which are electrically connected to the main computer 511. The main computer 511 acts, when an administration software works, as means 511a for displaying a layout, means 511b for administrating articles to be stored, and means 511c for instructing an action.

The means 511a for displaying a layout displays a layout of an entire storage space in the display means 512.

The means 511b for administrating articles to be stored checks whether the article is stored in an indicated position in the suspenders 33, and displays a mark, which is indicative of the article 10, at a position where the article 10 is stored, in the layout displayed in the display means 512 by the means 511a for displaying a layout. The means 511b for administrating articles to be stored further memorizes what is contained in the article 10, input through the input means 513, in connection with identification data assigned to storage spaces, and displays the same in the display means 512.

The means 511c for instructing an action has functions of, when a resident as a user handles the input means 513 for providing an instruction to bring the article into or take the article out of a storage space, instructing the controller 52 to do the same, and outputting identification data assigned to a storage position at which the article to be taken out is stored and/or identification data assigned to a storage position at which the article 10 is to be stored, to the controller 52.

The display means 512 displays a layout of a storage space to a user, and may be comprised of CRT or LCD. An instruction of bringing the article into or taking the article out of the storage space is input through the input means 513, and may be comprised of a joystick, as well as a keyboard or a mouse. In the first embodiment, the input means 513 is comprised of a touch panel.

The controller 52 is designed to include a one-chip microcomputer therein, and acts as means 521 for detecting a position of an article, means 522 for administrating a current position, and means 523 for controlling carriage, when a program incorporated in the controller 52 operates.

The means 521 for detecting a position of an article has a function of detecting a position in a storage space in accordance with the identification data received from the personal computer 51, in particular, the means 511c for instructing an action.

The means 522 for administrating a current position has a function of memorizing a current position at which the platform car 32 presently is.

The means 523 for controlling carriage has a function of controlling the drive motor for driving the guide rail 31, the platform car drive motor 3211e and the up/down drive motor 3222a of the platform car 32, and the stage drive motor 425 of the lift unit 4 in accordance with instructions received from the personal computer 51. For instance, when the article 10 is to be brought into the storage space, the means 523 for controlling carriage instructs sequential actions including moving the platform car 32 to the lift unit 4 from the current position of the platform car 32 memorized in the means 522 for administrating a current position, transferring the article 10 to the platform car 32 from the lift unit 4, moving the platform car 32 from the lift unit 4 to a storage position at which the article 10 is indicated to be stored, and storing the article 10 into the suspenders 33. When the article 10 is to be taken out of the storage space, the means 523 for controlling carriage instructs sequential actions including moving the platform car 32 from its current position to a storage position at which the article 10 is to be taken out, taking the article 10 to the platform car 32 out of the suspenders 33, moving the platform car 32 to the lift unit 4 from the storage position, and transferring the article 10 to the lift unit 4 from the platform car 32.

When the sequential actions of the platform car 32 are completed, the means 523 for controlling carriage stores a new current position of the platform car 32, which was changed due to the movement of the platform car 32, into the means 522 for administrating a current position.

Figure 13:
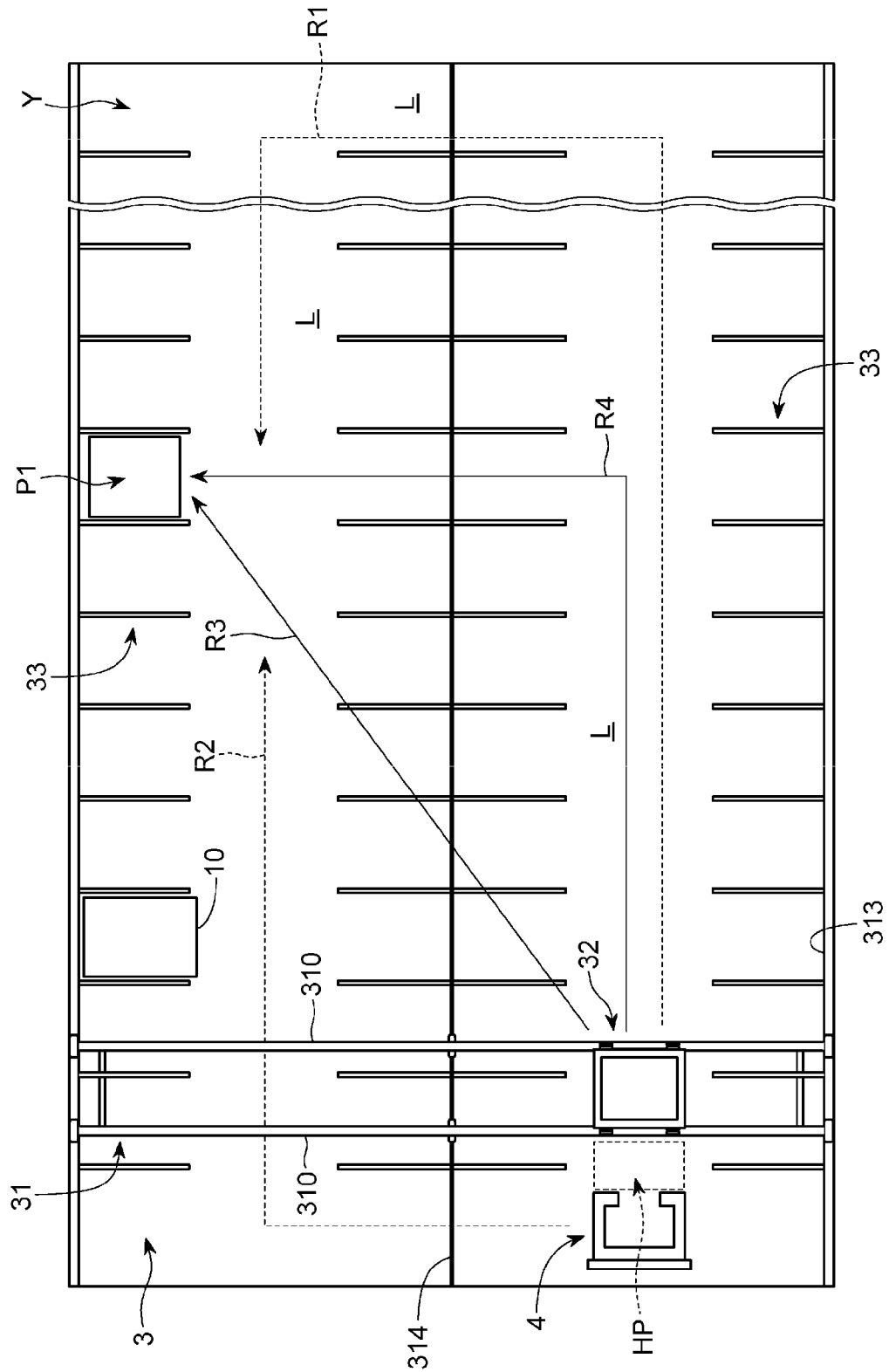
FIG. 13 is a drawing used for explaining movement paths along which the platform car travels.
Figure 14:
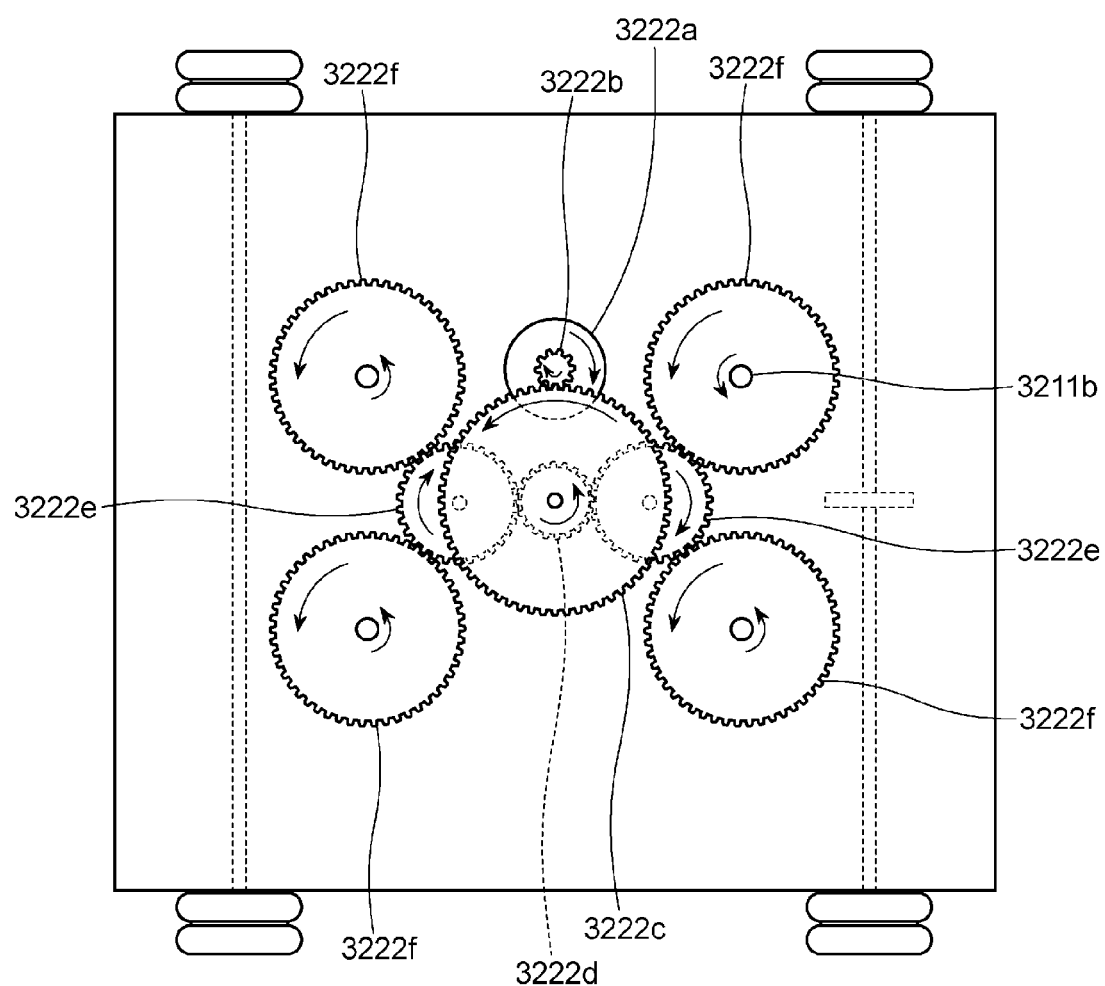
FIG. 14 is a drawing used for explaining the operation of the lifting/lowering section of the platform car.

Hereinbelow is explained the operation of the in-building storage apparatus 1 in accordance with the first embodiment, having the structure as mentioned above, with reference to the drawings. FIG. 13 is a drawing used for explaining movement paths along which the platform car travels. FIG. 14 is a drawing used for explaining the operation of the lifting/lowering section of the platform car.

Hereinbelow is explained a case in which the article 10 stored at a storage position P1 illustrated in FIG. 13 is to be taken out. The article 10 is in a condition of being suspended by the suspenders 33.

A resident checks a position of the article 10 to be taken out, displayed in a screen of the display means 512 by the personal computer 51, specifically, the means 511*a* for displaying a layout and the means 511*b* for administrating articles to be stored, and handles the input means 513 to give an instruction of taking the article 10 out of the storage space. On receipt of the instruction, the means 511*c* for instructing an action, of the personal computer 51 transmits the identification data indicative of a storage position of the article 10 to be taken out, to the controller 52 together with the instruction.

In accordance with the identification data received from the personal computer 51, the means 521 for detecting a position of an article, of the controller 52 identifies a storage position of the article 10 to be taken out. In accordance with both the data indicative of the storage position, received from the means 521 for detecting a position of an article, and the data indicative of a current position of the platform car 32, received from the means 522 for administrating a current position, the means 523 for controlling carriage causes the guide rail 31 to make sliding movement to a storage position at which the article 10 to be taken out is stored, from a current position of the platform car 32, and simultaneously, causes the platform car 32 to move along the guide rail 31. Since the platform car 32 does not load the article 10 on the platform 3221, the platform car 32 can travel below the suspenders 33. Consequently, the means 523 for controlling carriage, of the controller 52 instructs both the drive motor of the guide rail 31 and the platform car drive motor 3211*e* of the platform car 32 such that the platform car 32 linearly moves from a position (an initial position) at which the platform car 32 receives the instruction, to a position (a target position) located below the article 10 to be taken out.

Since the platform car 32 does not make collision with the articles 10 suspended by the suspenders 33, even if the platform car 32 moves below the suspenders and traverses the paths L along the moving guide rail 31, it is possible to swiftly move the platform car 32 to a position at which the article 10 indicated to be taken out is.

For instance, when the platform car 32 moves from a home position HP to the target article 10 instructed to be taken out, as illustrated in FIG. 13, it is possible to select routes R1 or R2 (shown with a broken line in FIG. 13) on which the platform car travels on a U-shaped path along the paths L. For instance, in the route R1, after moving to the deepest path L in the underfloor Y, the platform car 32 perpendicularly turns, and forwards to the target article 10, making a U-figured detour. In the route R2, the lift unit 4 is elevated to such a height that the platform car 32 is able to pass therebelow. In contrast, it is possible to minimize a period of time for movement, if the platform car travels on a straight route R3 which is shorter in distance than the routes R1 and R2. As an alternative, it is possible to shorten a period of time for movement, if the platform car travels in a route R4 in which the platform car perpendicularly traverses the suspenders 33 arranged in rows, as compared to a case in which the platform car travels on the paths L. Thus, it is possible to shorten a period of time for movement by causing the platform car to travel to the target article 10 through the routes R3 or R4.

When the platform car 32 arrives at a location which is below the suspenders 33 by which the article 10 instructed to be taken out is suspended, the carriage controlling means 523 of the controller 52 transmits an instruction to drive the up/down drive motor 3222*a* to thereby elevate the platform 3221. In the elevation of the platform 3221, as illustrated in FIG. 14, a drive shaft of the up/down drive motor 3222*a* first rotates in a clockwise direction, and resultingly, the drive transfer gear 3222*b* rotates in a clockwise direction. The rotation of the drive transfer gear 3222*b* in a clockwise direction makes both the larger-diameter gear 3222*c* and the smaller-diameter gear 3222*d* rotate in a counter-clockwise direction. The rotation of the smaller-diameter gear 3222*d* in a counter-clockwise direction makes both of the first relay gears 3222*e* rotate in a clockwise direction. The rotation of the cylindrical platform holder 3222*g* together with the four second relay gears 3222*f* in a counter-clockwise direction causes the supports 3221*b* of the platform 3221 to be upwardly moved along the female thread formed at an inner surface of each of the platform holders 3222*g*, and accordingly, the plate 3221*a* upwardly moves (see FIG. 4).

The upward movement of the platform 3221 pushes up a bottom of the tray 11 of the article 10. Since the platform 3221 has a width smaller than a gap formed between the horizontal members 3312, the platform 3221 does not make collision with the horizontal members 3312. As a result, the platform 3221 is fit into the rectangular recess 112 formed at a bottom of the tray 11, and pushes the tray 11 up, the article 10 as a whole is lifted up from the horizontal members 3312 of the suspenders 33. Since the platform 3221 is fit into the rectangular recess 112, the platform car 32 can stably carry the article 10.

The carriage controlling means 523 causes the platform car 32 on which the article 10 is loaded to go back away from the suspenders 33 to the path L, and further, controls the guide rail 31 and the platform 32 with the platform 32 loading the article 10 thereof such that the platform car 32 travels on the path L to the lift unit 4. The carriage controlling means 523 instructs the platform car 32 to travel in either the route R1 or R2.

When the platform car 32 travels in the route R1 or R2, the platform car 32 is necessary to pass a perpendicular corner of the path L. For instance, if the route R1 were selected, the control unit 5 causes the guide rail 31 to move to a deep side which is opposite to the lift unit 4, and causes the platform car 32 to move along the guide rail 31, ensuring that the platform car 32 is able to pass the perpendicular corner of the path L. That is, each of the guide rail 31 and the platform car 32 make only linear movement, it would be possible to simplify structures of the wheels 312 of the guide rail 31 and the wheels 3211*a* of the platform car 32. Furthermore, since the platform car 32 can perpendicularly turn, it is possible to arrange the articles 10 in rows, ensuring it possible to make effective use of a storage space.

It is possible to move the platform car 32 in any directions, even if the wheels 312 of the guide rail 31 and the wheels 3211*a* of the platform car 32 have a simple structure which cannot turn the guide rail 31 and the platform car 32, by causing the guide rail 31 to make slidal movement, and then, moving the platform car 32, moving the platform car 32, and then, causing the guide rail 31 to make sliding movement, or moving the platform car 32 while causing the guide rail 31 to make sliding movement.

Then, the carriage controlling means 523 causes the platform car 32 to forward into the stage 41 of the lift unit 4. Since the stage 41 is designed to be located at such a height that the stage 41 is located between the plate 3221*a* and the main frame 3210 when the platform 3221 is in an elevated position, the article 10 does not make collision with the stage 41, even if the platform car 32 forwards into the stage 41. Then, the carriage controlling means 523 lowers the platform 3221 to thereby deliver the article 10 loaded on the platform 3221 to the stage 41. Since the platform 3221 is designed to have such a length that the platform 3221 is able to upwardly and downwardly move between the arms 411a of the table 411, the platform 3221 does not make collision with the arms 411a.

After the article 10 was loaded on the stage 41, the carriage controlling means 523 causes the platform car 32 to move out of an area where the stage 41 elevates. After the platform car 32 moved out of an area where the stage 41 elevates, the carriage controlling means 523 drives the stage drive motor 425 (see FIG. 9) to cause the chain wheels 422 to pull up the chains 421, resulting in that the stage 41 elevates, and the article 10 is lifted up to the opening 43a (see FIG. 8). Thus, a resident can take out the target article 10 through the opening 43a among a lot of articles 10. Consequently, since the lift unit 4 carries the article 10 to the opening 43a, that is, the entrance/exit EX1, a resident is able to readily receive the article 10 carried by the platform car 32, through the entrance/exit EX1 without working.

Bringing the article 10 into a storage space can be accomplished in accordance with the steps opposite to the steps for taking the article 10 out of a storage space. When the article 10 is brought into a storage space, if the article 10 containing goods therein were over a predetermined weight, the personal computer 51 may control the article 10 to be suspended by the suspenders 33 located in the outer two rows among the four rows of the suspenders 33, and if the article 10 were below a predetermined weight, the personal computer 51 may control the article 10 to be suspended by suspenders 33 located in the inner two rows. This is because that the suspenders 33 located in the outer two rows are fixed by both of the vertical member 3311 making contact with a wall and the horizontal member 3312 making contact with a ceiling of the underfloor, and hence, the suspenders have a higher suspension strength than the suspenders 33 located in the inner two rows. By appropriately assigning storage spaces into the articles 10 in dependence on a weight of the articles 10 containing goods therein, it is possible to enhance safety. A weight of the article 10 may be manually input to the personal computer 51. As an alternative, the platform car 32 may be designed to include a gravimeter for measuring a weight of the article, in which case, the gravimeter transmits a measured weight to the personal computer 51.

As well as bringing the article 10 into and taking the article 10 out of a storage space, it is also possible to move the article 10 to the attic X from the underfloor Y, or to the underfloor Y from the attic X. When the article 10 is to be taken out of a storage space, a resident can take the article 10 by upwardly moving the stage 41 of the lift unit 4 to the opening 43a. When the article 10 is to be moved to the attic X from the underfloor Y, the stage 41 is moved upwardly to the entrance/exit EX2 of the attic X, and an attic storage apparatus 2 mounted in the attic X is operated. Thus, it is possible to store the article 10 at a desired storage space in the attic X.

When the article 10 is to be moved to the underfloor Y from the attic X, the steps opposite to the above-mentioned steps are carried out. Since the in-building storage apparatus 1 includes the lift unit 4 capable of moving between the underfloor Y and the attic X, it is possible to move the article 10 between the attic X and the underfloor Y. Thus, though some articles are stored in the attic X because the underfloor Y is full of the articles 10, when the articles 10 stored in the underfloor Y and the attic X are to be exchanged to each other in a summer or a winter in which a temperature difference in the attic X is expected to be extreme, it would be possible to readily rearrange the articles 10.

Though the in-building storage apparatus 1 in accordance with the first embodiment is mounted in a one-story house, the in-building storage apparatus 1 may be mounted each of stories of a multistoried condominium or apartment, in which case, the lift unit may be designed to be able to stop at each of stories. This ensures that wastes can be carried to a first story without going out, by storing wastes in the attic X or the underfloor Y, carrying the wastes to the lift unit by means of an attic storage apparatus 2 or an underfloor storage apparatus 3 on a waste-gathering day, and carrying the wastes to a first story by means of the lift unit.

In the first embodiment, since the articles 10 are arranged in a plurality of rows, there is defined the path L having a perpendicular corner. Since the platform car 32 on which the article 10 is loaded is able to move in an area in which the guide rail 31 can make sliding movement, even if the path has a corner having an acute angle or an obtuse angle, or the path is arcuate, the platform car 32 on which the article 10 is loaded is able to bring the article 10 into or take the article out of a storage space. If an underfloor or an attic were rectangular when viewed vertically, it is preferable to store the articles 10 in a plurality of rows, as illustrated in FIG. 2, to thereby define the path L having a perpendicular corner, in order to store the articles 10 as much as possible.

As mentioned above, in the underfloor storage apparatus 3, the platform car 32 can linearly move to the target article 10 for taking the target article 10 out, regardless of how much articles are loaded thereon. Accordingly, even if a lot of the articles 10 are stored in the storage space, an operator does not need to work, because the platform car 32 take out a target article, and furthermore, the platform car 32 is able to move to a target storage container at a minimum route for taking out the article 10.

In the first embodiment, the suspenders 33 are designed to include the frames 331 having the horizontal members 3312 spaced away from one another at a certain pitch in parallel with one another for suspending the articles 10 at its lower ends. As an alternative, there may be used two sets of bars as vertical members, each set including two bars. The sets are spaced away from each other by a gap equal to or greater than a width of the article 10, and each of the bars is formed at a lower end thereof with a holding section inwardly protruding, in order to hold the article 10.

In the lift unit 4 in the first embodiment, the wheels 412c formed at the vertical sections 412a of the stage 41 is designed to run on inner surfaces of the elevation rails 43c in order for the stage 41 to stably move upwardly and downwardly. For instance, the lift unit may be designed, like a roof tile lifting machine, to include U-shaped rails extending in parallel with each other and each having an opening facing outwardly, and two wheels formed at the vertical sections of the stage and running on longitudinal side walls of the rails in such a way that the wheels sandwich the side walls therebetween.

Furthermore, though the lifting/lowering section 3220 of the platform car 32 is designed to have a structure including a combination of a plurality of gears as the lifting/lowering driving section 3222, the platform 3221 may be designed to move upwardly and downwardly by means of a hydraulic cylinder. As an alternative, there may be used the pantograph system disclosed in the patent reference 1 (Japan Utility Model Application Publication No. 56-176335), as a mechanism for upwardly and downwardly moving the platform 3221.

Second Embodiment

Figure 15:
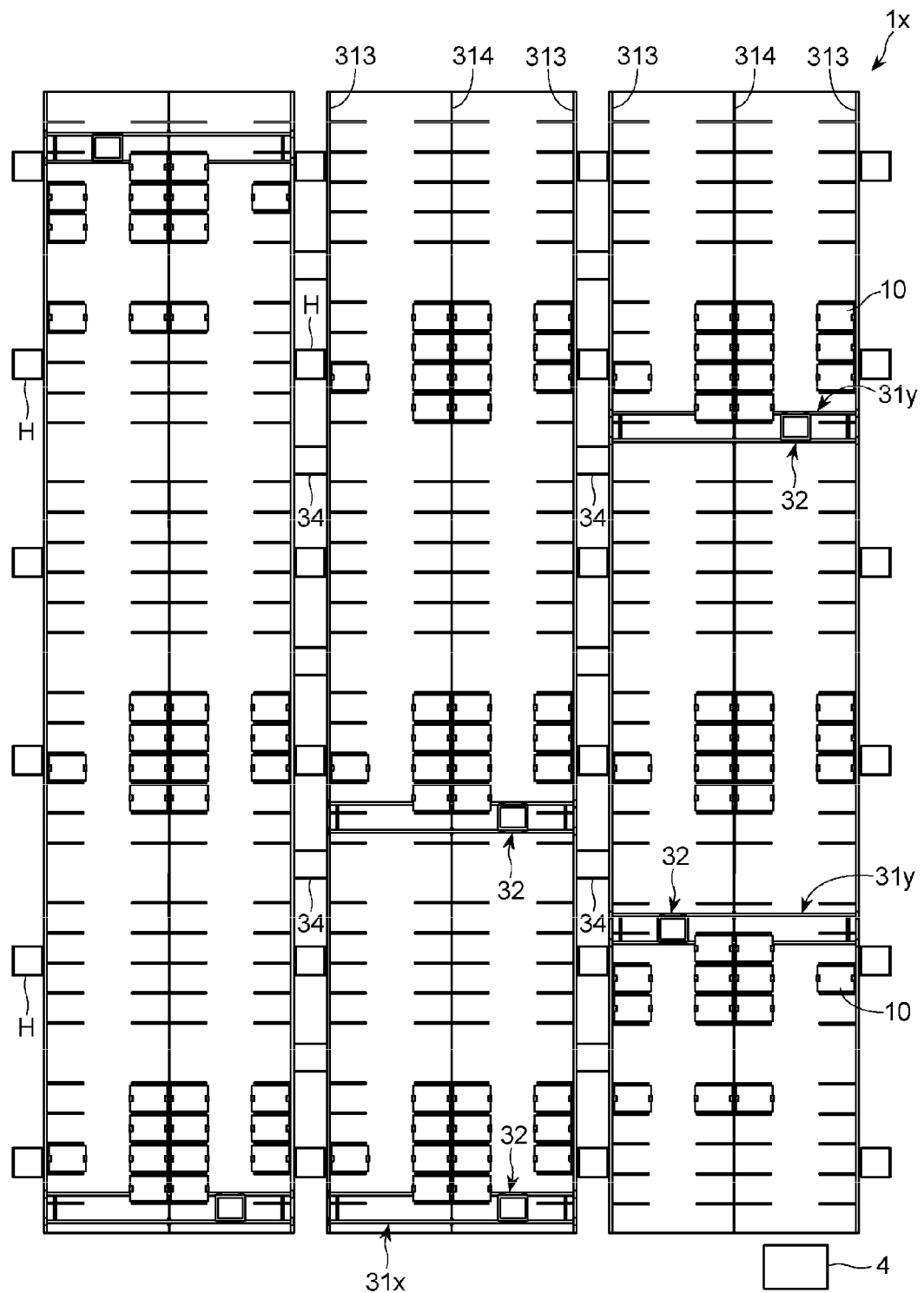
FIG. 15 is a plan view of the in-building storage apparatus in accordance with the second embodiment of the present invention.
Figure 16:
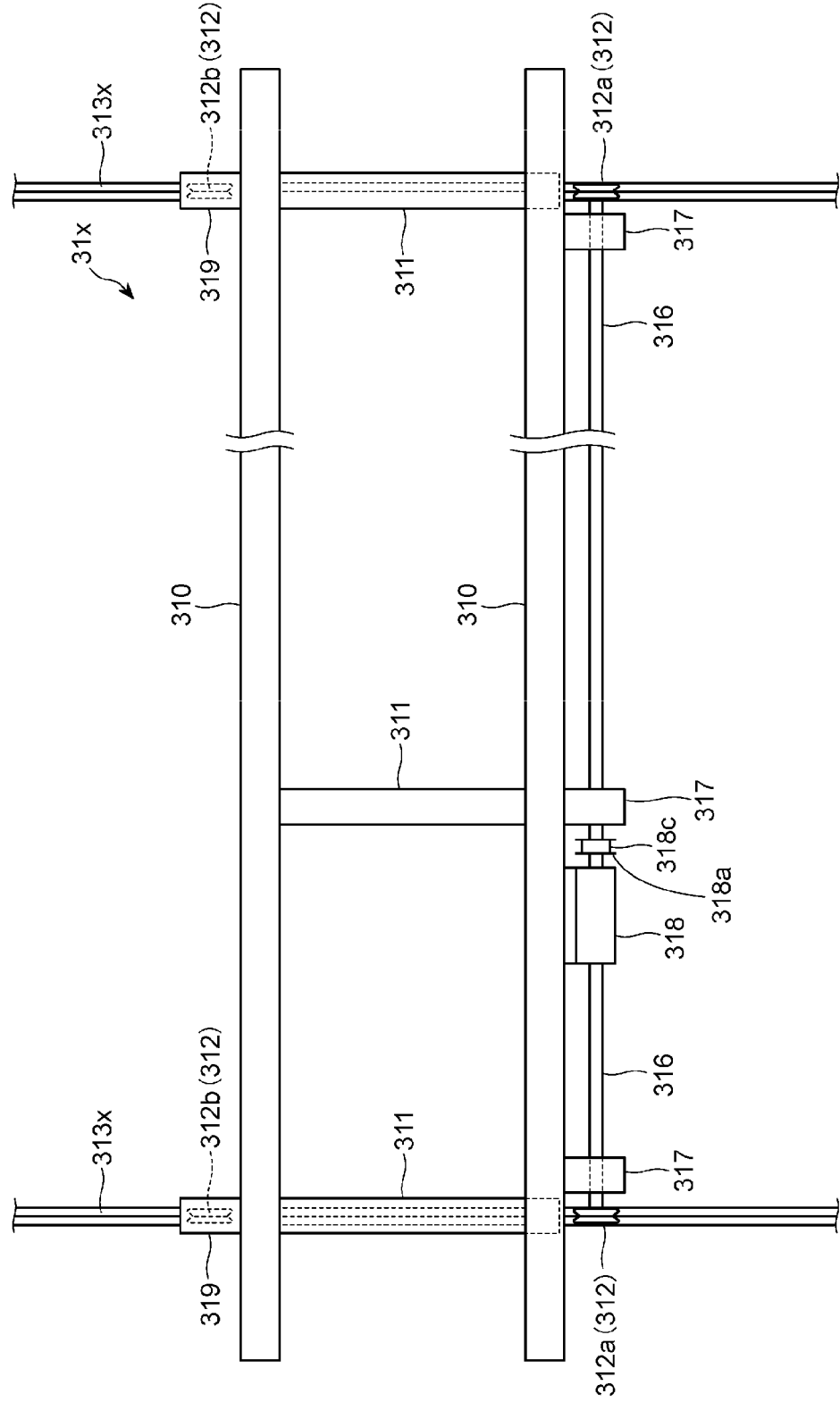
FIG. 16 is a partially enlarged view of the guide rail and the relay rail.
Figure 17:
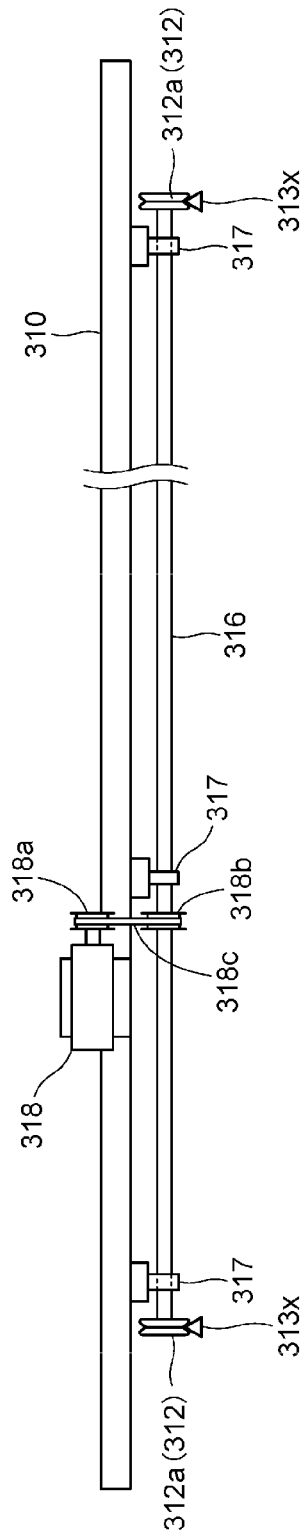
FIG. 17 is a front view of the guide rail.
Figure 18:
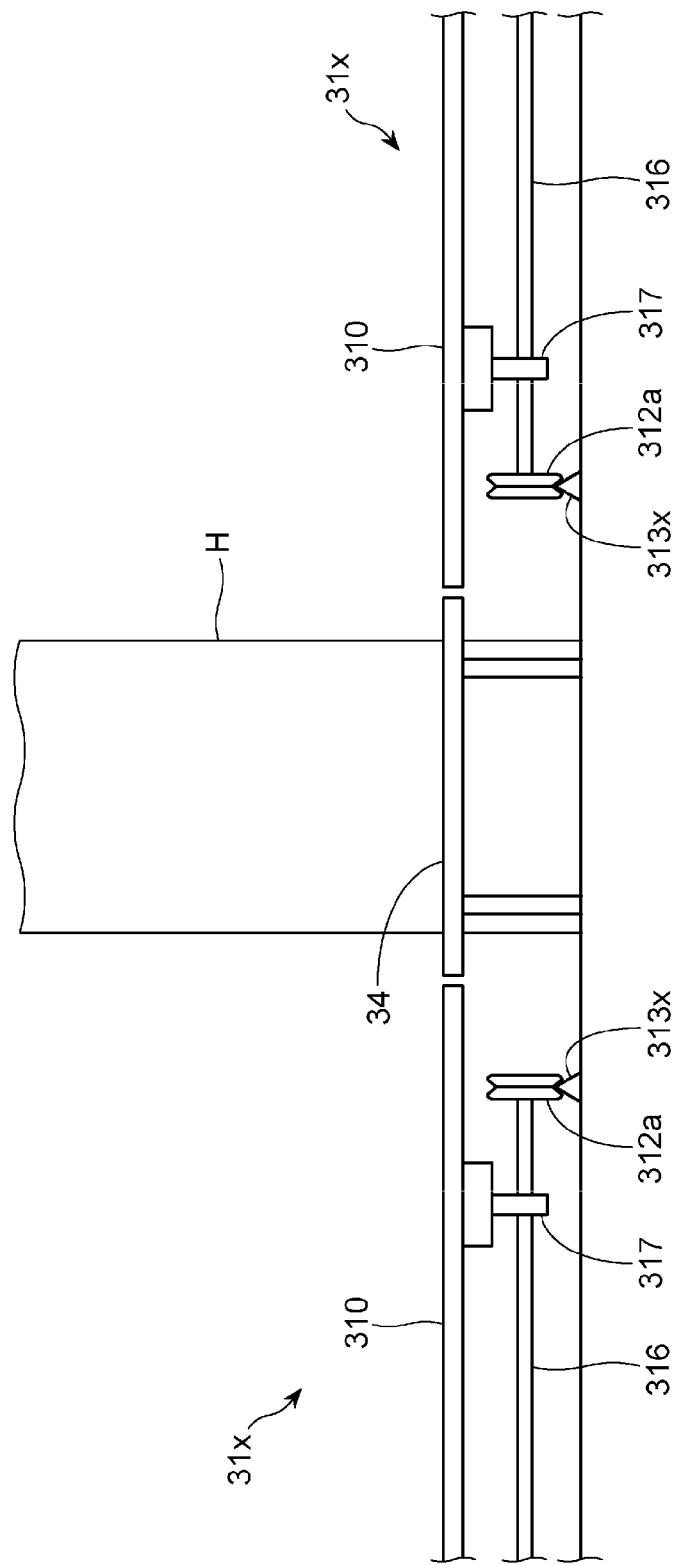
FIG. 18 is a partially enlarged view of the guide rail and the relay rail.
Figure 19:
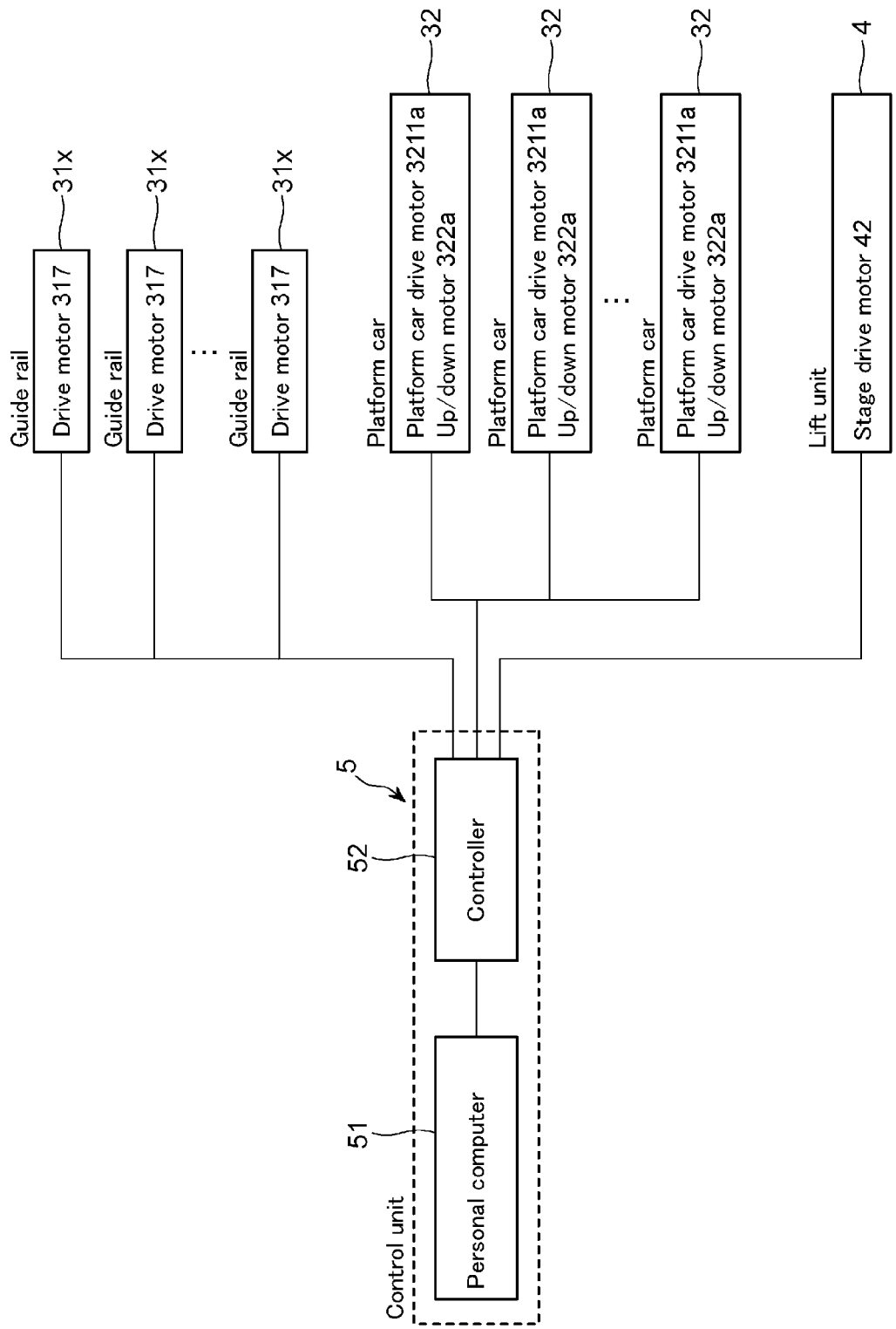
FIG. 19 is a block diagram of the control unit.
Figure 20:
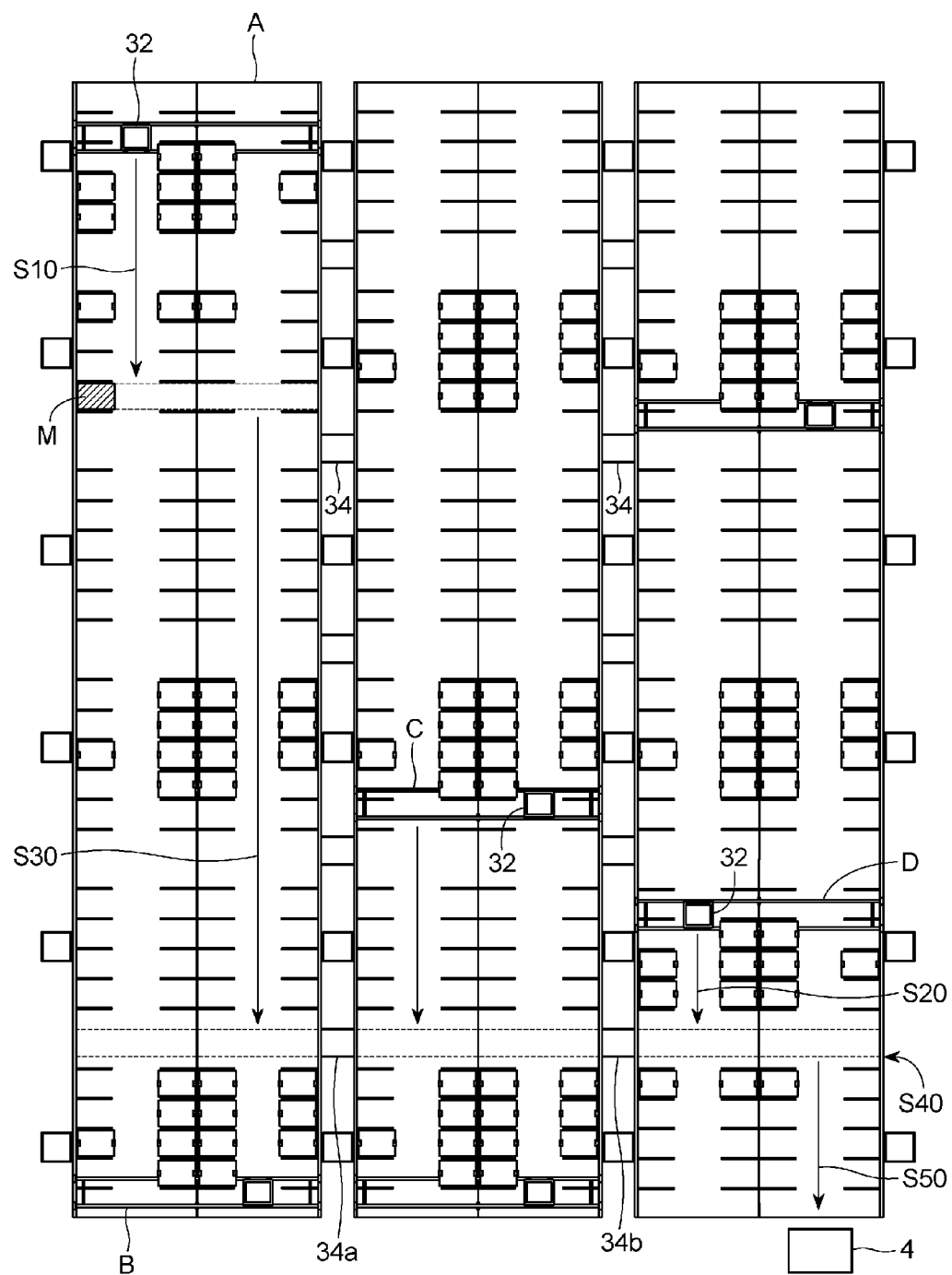
FIG. 20 is a drawing used for explaining routes along which the guide rail is moved.

The in-building storage apparatus in accordance with the second embodiment of the present invention is explained hereinbelow with reference to the drawings. FIG. 15 is a plan view of the in-building storage apparatus in accordance with the second embodiment of the present invention. FIG. 16 is a partially enlarged view of the guide rail and the relay rail. FIG. 17 is a front view of the guide rail. FIG. 18 is a partially enlarged view of the guide rail and the relay rail. FIG. 19 is a block diagram of the control unit. FIG. 20 is a drawing used for explaining routes along which the guide rail is moved. Parts or elements illustrated in FIGS. 15 to 20 that have the same structure as that of the in-building storage apparatus 1 in accordance with the first embodiment have been provided with the same reference numerals, and explanation of them is omitted.

As illustrated in FIG. 15, the in-building storage apparatus 1x in accordance with the second embodiment brings a lot of articles into and takes the same out of a broad storage space.

The in-building storage apparatus 1x includes a plurality of guide rails 31x. The guide rail 31x runs along a pair of travel paths 313. By arranging adjacent pairs of the travel paths 313 in parallel with each other, the guide rails 31x running on them make sliding movement in parallel. FIG. 15 illustrates a three pairs of the travel paths 313 on each of which the two guide rails 31x moves. Each of the two guide rails 31x is able to make sliding movement to one end from the opposite end in a travel path 313x. The travel path 313x comprises a pair of rails parallel with each other and each having a substantially triangular cross-section.

As illustrated in FIGS. 16 and 17, the guide rail 31x includes a pair of main rails 310 arranged in parallel with each other, and connection frames 311 spacing the main rails 310 away from each other by a predetermined gap for arranging the main rails 310 in parallel with each other. The three connection frames 311 space the two main rails 310 away from each other by a predetermined gap.

The main rails 310 are formed at opposite ends thereof with a wheel 312 for running on the travel path 313 to allow the guide rail 31x to make sliding movement. The wheel 312 includes totally four wheels, specifically, a pair of drive wheels 312a formed at one of the main rails 310, and a pair of driven wheels 312b formed at the other of the main rails 310. The wheel 312 is fixed such that it runs in a direction along the travel path 313.

The drive wheels 312a are driven through a rotation shaft 316. The rotation shaft 316 is rotatably supported by one of the main rails 310 through an attachment part 317.

The rotation shaft 316 is rotated by a drive motor 318. A rotation drive force is transferred to the rotation shaft 316 through a drive shaft pulley 318a fixed to a rotation shaft of the drive motor 318, and a drive-force transfer belt 318c wound around a driven shaft pulley 318b coaxial with the rotation shaft 316. Forward or backward rotation of the drive motor 318 causes the guide rails 31x to make sliding movement in opposite directions perpendicular to a longitudinal direction of the main rails 310.

The driven wheels 312b are rotatably suspended from the other of the main rails 310 by means of a suspension 319.

Since the connection frames 311, the attachment part 317, and the suspension 319 are located below upper surfaces of the main rails 310, and a drive system, specifically, the drive motor 318 and the drive shaft pulley 318a are located outside of the main rails 310, the platform car 32 is able to run, when running on the upper surfaces of the main rails 310, from one end to the other end without interference.

As illustrated in FIG. 15, in an area in which the guide rails 31x make sliding movement, there are formed pillars H at a certain pitch for supporting a ceiling of the storage space.

There is arranged a relay rail 34 within an area in which each of the guide rails 31x makes sliding movement and further between the pillars H.

As illustrated in FIG. 18, the relay rail 34 is comprised of two short rails having a width identical to the same of the main rails 310, and having the same height as each other. The guide rail 31x and another guide rail 31x located adjacent thereto make sliding movement relative to each other to thereby make a line together with the relay rail 34.

In the second embodiment, the central travel path 314 which is to be arranged intermediate between the travel paths 313x in the in-building storage apparatus 1 in accordance with the first embodiment is omitted. Accordingly, the guide rail 31x is not formed with the wheels 315 which run on the central travel path 314.

As illustrated in FIG. 19, the drive motors 318 of the guide rails 31x, the platform car drive motor 3211e and the up/down drive motor 3222a of the platform cars 32, and the stage drive motor 425 of the lift unit 4 are controlled by the control unit 5 with respect to horizontal movement, and upward and downward movement. The movement control carried out by the control unit 5 is identical with the same in the first embodiment except that the second embodiment includes a plurality of the guide rails 31x and the platform cars 32.

An operation of the in-building storage apparatus 1x in accordance with the second embodiment, having such a structure as mentioned above, is explained hereinbelow with reference to the drawings.

In the second embodiment, a case in which a storage article M (shown with oblique lines) stored in a storage space illustrated in FIG. 20 is to be transferred to the lift unit 4 is explained.

The carriage controlling means 523 of the controller 52 controls the guide rail 31x in accordance with identification data received from the personal computer 51, indicative of a location at which the storage article M is stored. Among guide rails A and B which make sliding movement in a common area, the carriage controlling means 523 instructs the guide rail A located closer to the storage article M to make sliding movement, and further instructs the platform car 32 to linearly travel from an initial position to a position of the target article 10 indicated to be taken out (see S10), passing below other articles 10 suspended by the suspenders 33 (not illustrated in FIG. 20).

The carriage controlling means 523 not only instructs the guide rail A to make sliding movement, but also instructs both a guide rail C located adjacent to an area in which the guide rail A makes sliding movement, and a guide rail D located adjacent to an area in which the guide rail C makes sliding movement, to make sliding movement to relay rails 34a and 34b on which the platform car 32 loading the storage article M thereon will run (see S20).

Since the relay rails 34a and 34b are positioned between the sliding areas of the guide rails A and C, D, it would be possible to stand the pillars H without interference to the sliding movement of the guide rails A and C, D, even if the pillars H have to be stood for supporting a ceiling of the storage space.

Then, the carriage controlling means 523 causes the platform car 32 running on the guide rail A to load the storage article M thereon, and instructs the platform car 32 to move to the relay rail 34a (see S30).

Thus, the guide rails A and C, D make a line together with the relay rails 34a and 34b therebetween (see S40).

The carriage controlling means 523 causes the platform car 32 loading the storage article M thereon to move to the guide rails C and D from the guide rail A. Since the carriage controlling means 523 causes the guide rails A and C, D to make a line, the platform car 32 can run without reducing a speed. Accordingly, it is possible to omit a period of time necessary for deceleration and/or stopping, in comparison with a case that the platform car 32 moves to the guide rail C from the guide rail A, and then, to the guide rail D from the guide rail C.

When the platform car 32 moves to the guide rail D, the carriage controlling means 523 causes the guide rail D to move to the lift unit 4 (see S50). Then, the carriage controlling means 523 instructs the platform car 32 to deliver the storage article M to the lift unit 4, and thus, the storage article M can be taken out of the storage space.

Though all of the guide rails A and C, D are caused to move to make a line in the second embodiment, for instance, if the guide rail C were initially positioned at a location at which the relay rails 34a and 34b are located in FIG. 20, only the guide rails A and D may be moved.

As mentioned so far, the in-building storage apparatus in accordance with the second embodiment of the present invention provides the same advantages as those provided by the first embodiment. In addition, since the control unit 5 causes the guide rails 31x to make sliding movement such that the guide rails 31x make a line, and then, causes the platform car 32 to travel over the guide rails 31x to carry a storage article, it is possible to have an advantage that an article can be brought into or taken out of a storage space, even though it were broad.

Though the pillars H are stood at a certain pitch for supporting a ceiling of the broad storage space in the second embodiment, it is possible to omit the relay rails 3 in a storage space in which it is not necessary to stand the pillars H.

In FIG. 20, though the guide rail A are caused to move to the relay rail 34a for delivering the article 10 to the guide rails C and D, there may be used another relay rail 34 for delivery of the article in dependence on status of the other relay rails 31x.

Third Embodiment

Figure 21:
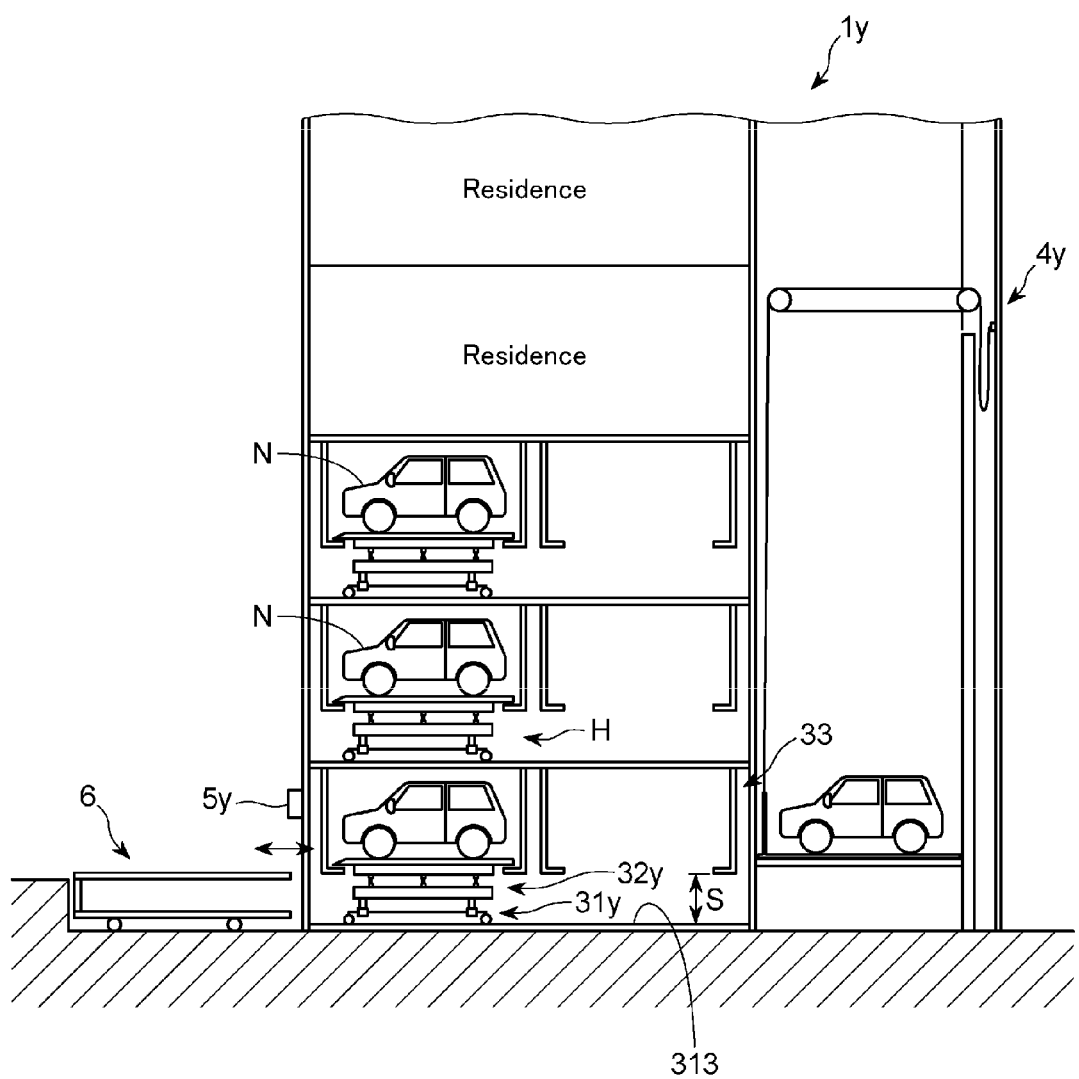
FIG. 21 is a vertical cross-sectional view of the in-building storage apparatus in accordance with the third embodiment of the present invention.
Figure 22:
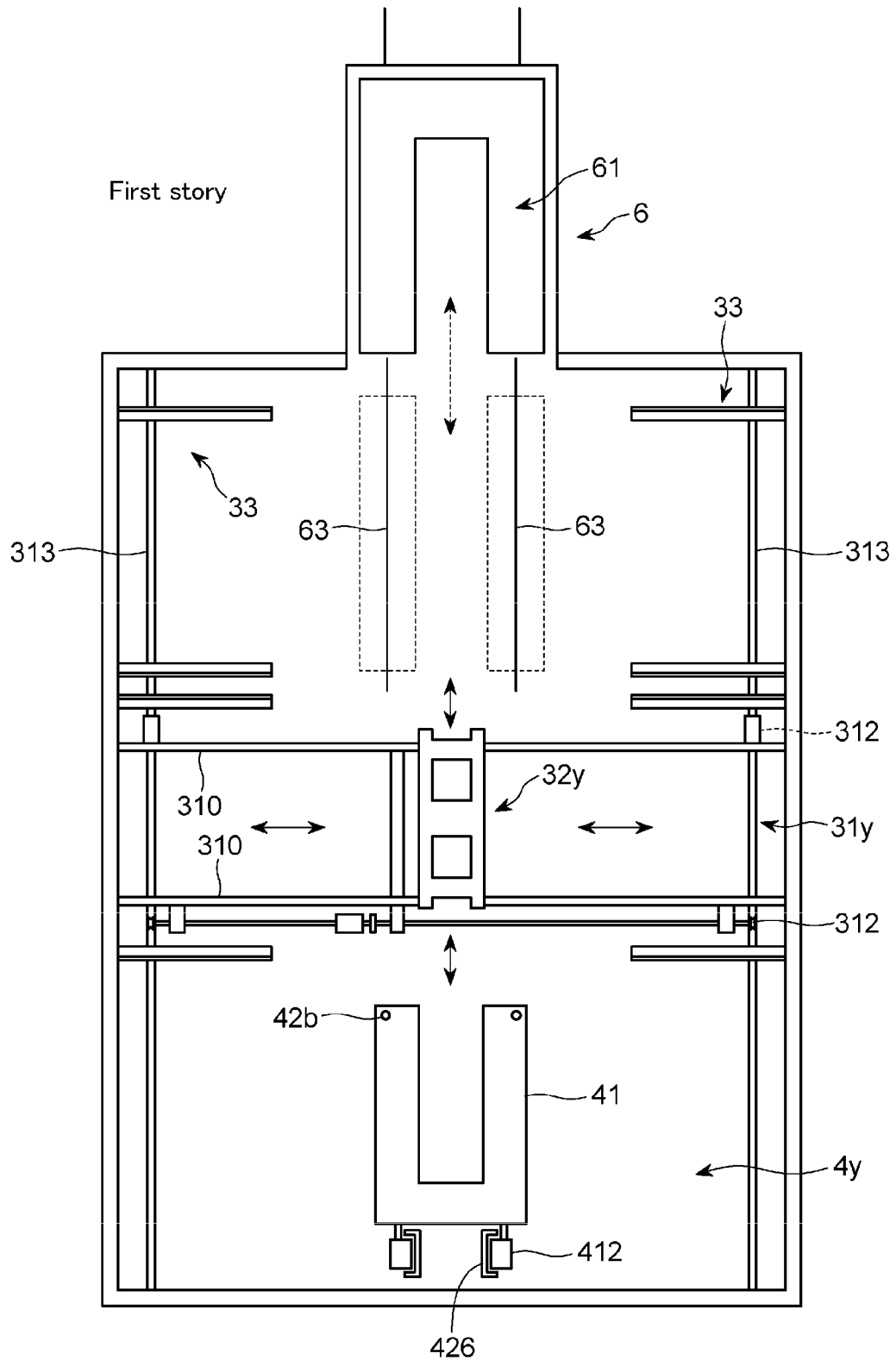
FIG. 22 is a horizontal cross-sectional view of a first story of the in-building storage apparatus illustrated in FIG. 21.
Figure 23:
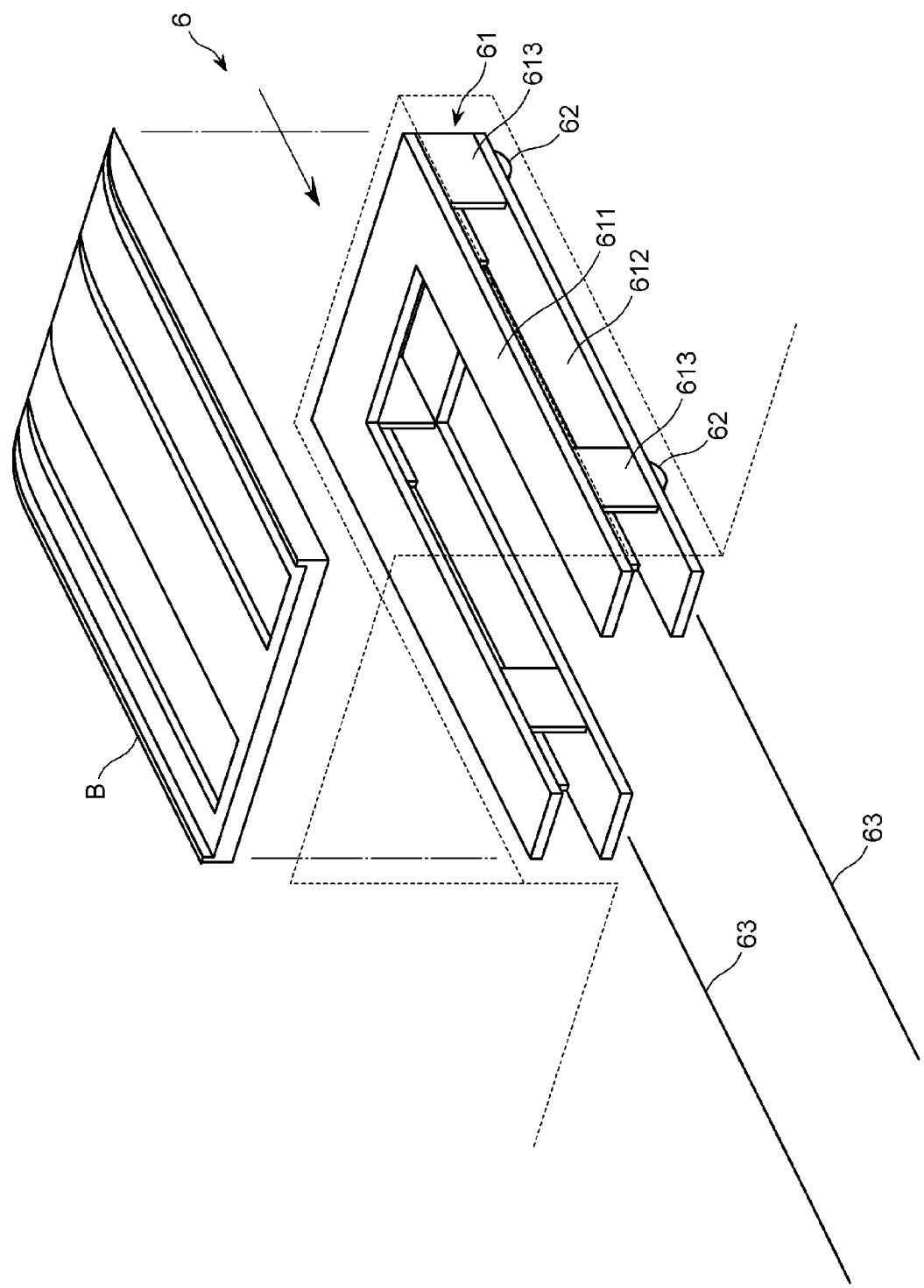
FIG. 23 is a perspective view of the unit for bringing an automobile into or taking an automobile out of a storage space.
Figure 24:
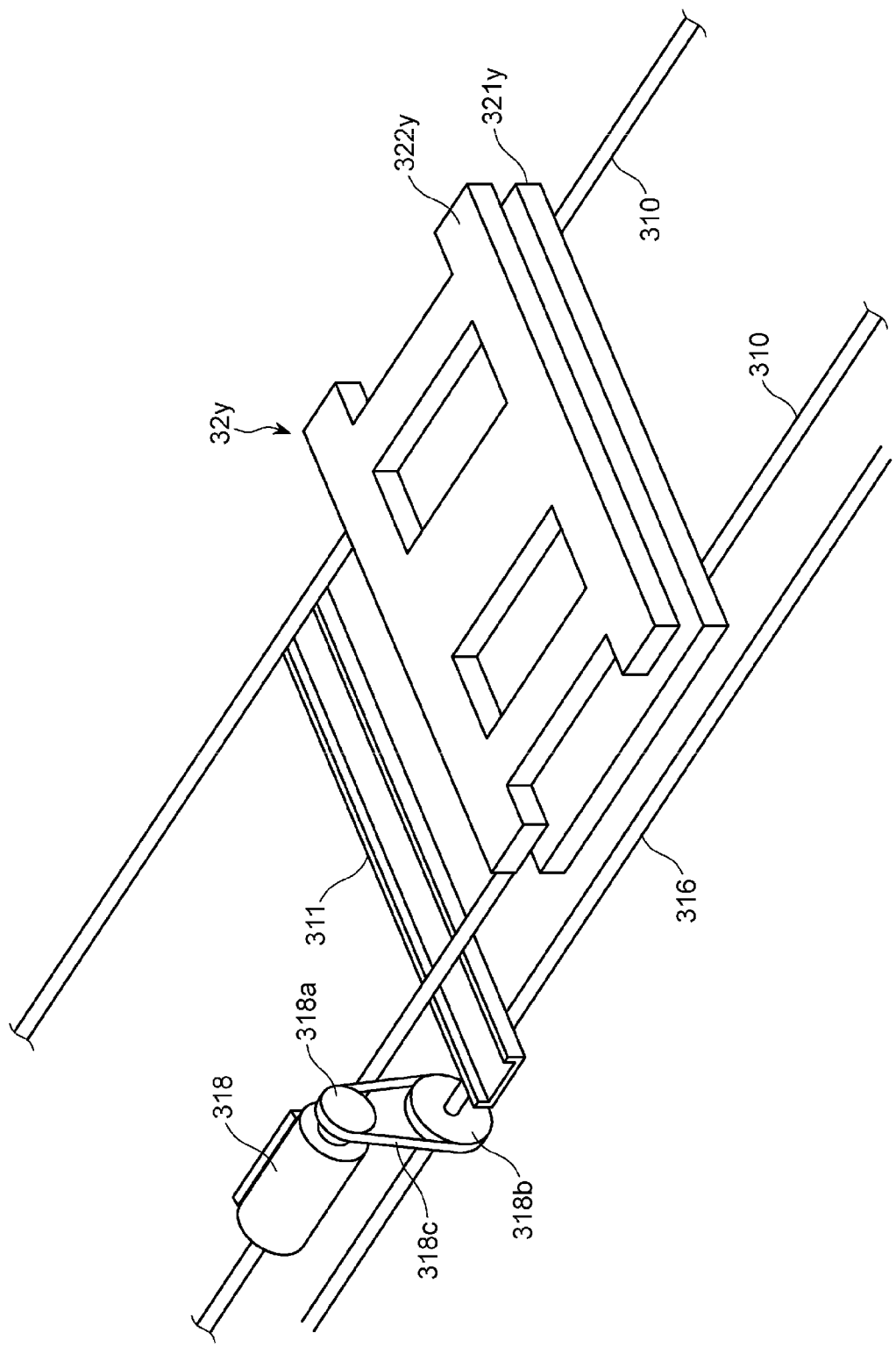
FIG. 24 is a perspective view of a part of the platform car and the guide rail.
Figure 25:
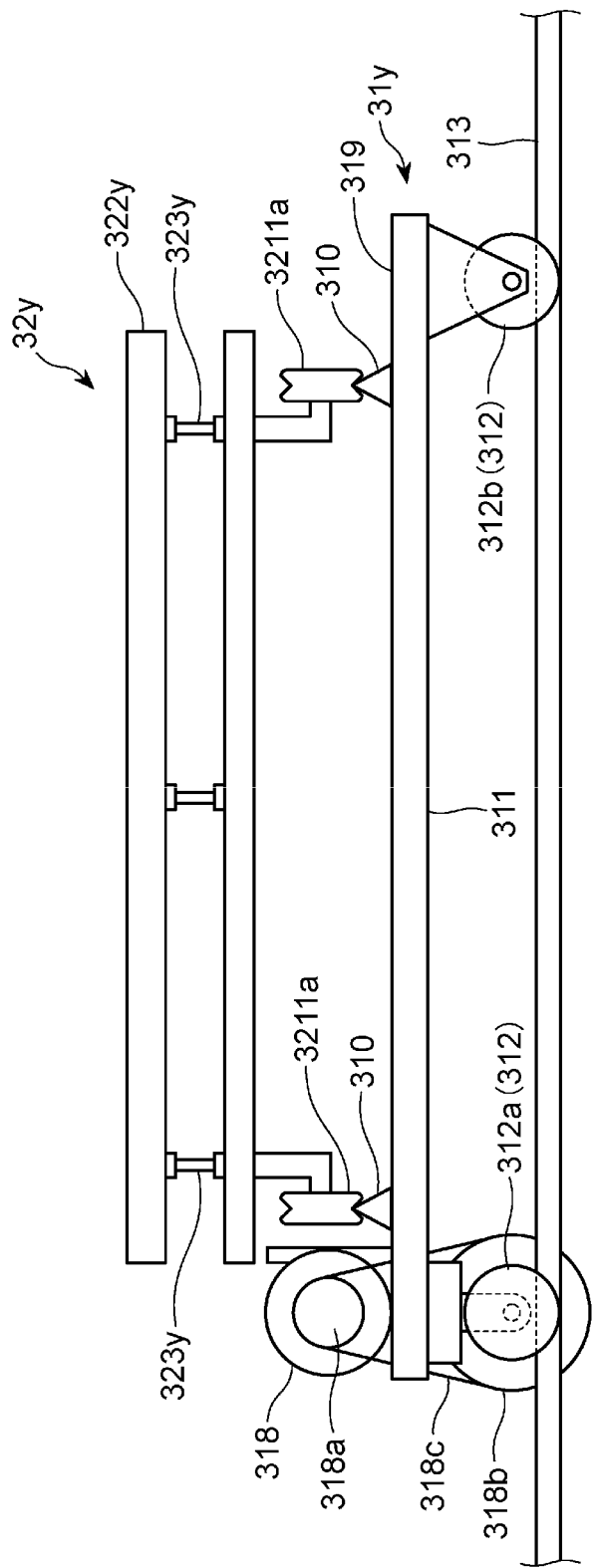
FIG. 25 is a side view of the platform car.
Figure 26:
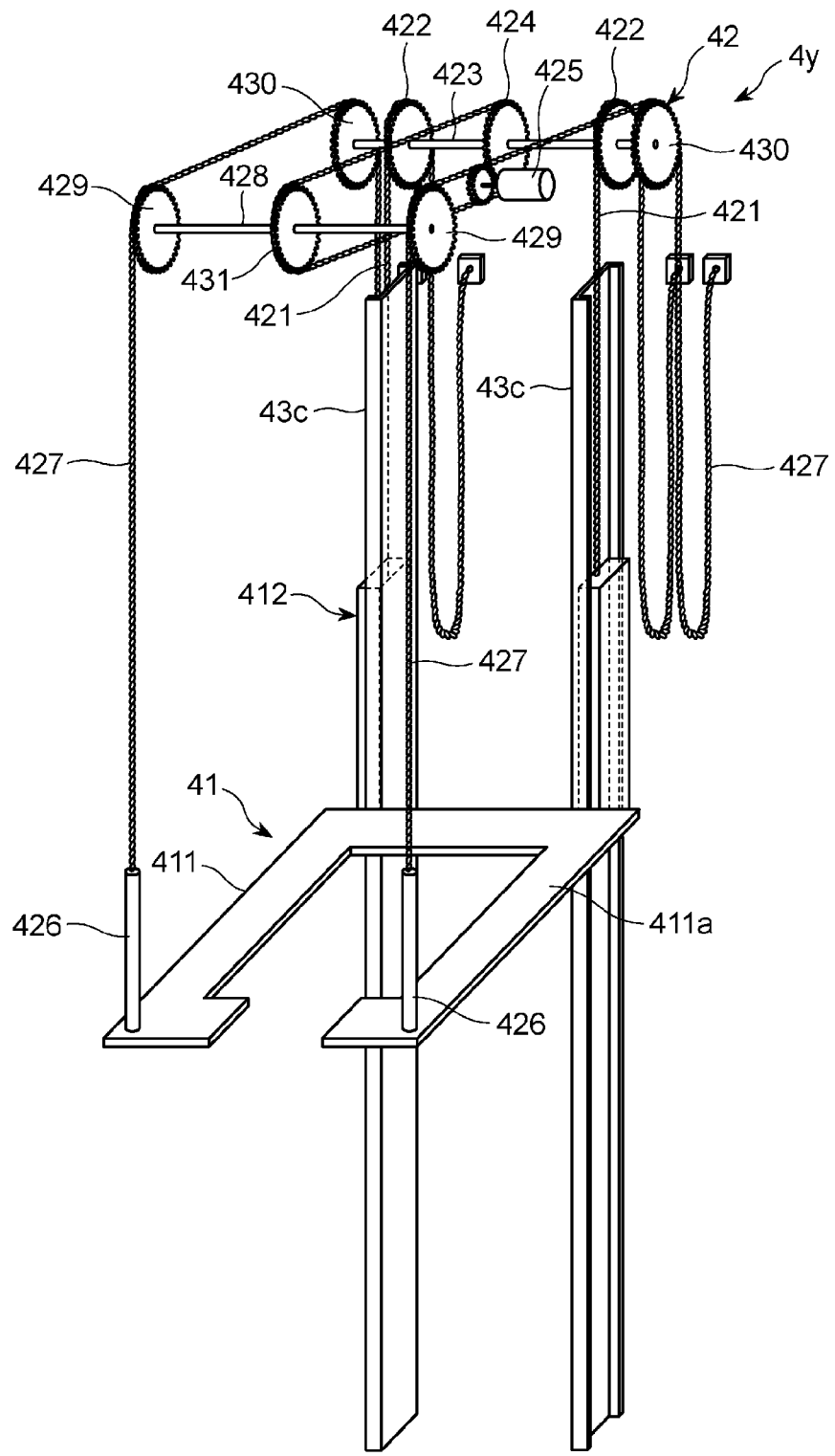
FIG. 26 is a perspective view of the lift unit.
Figure 27:
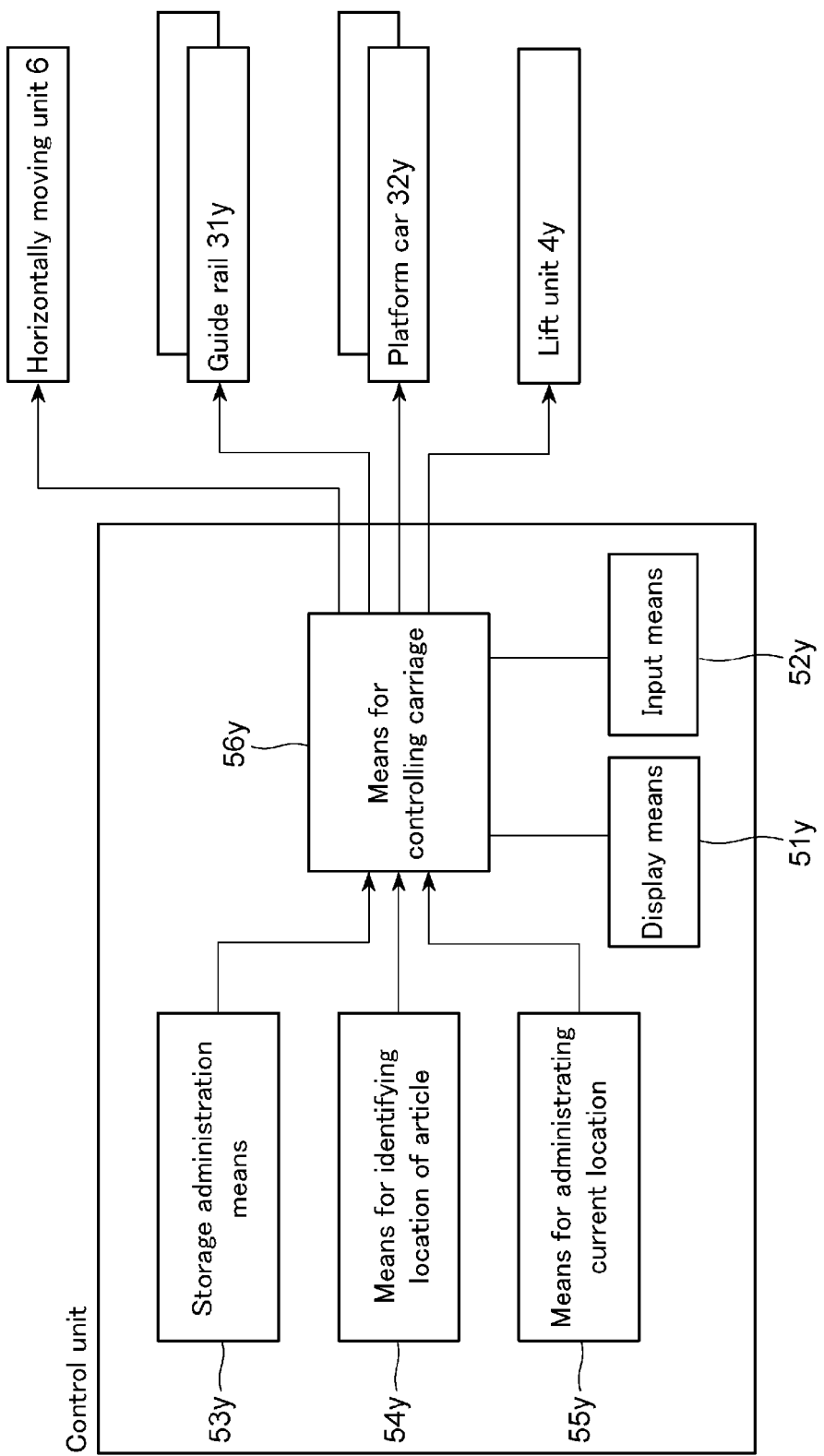
FIG. 27 is a block diagram of the control unit.

The in-building storage apparatus in accordance with the third embodiment of the present invention is explained hereinbelow with reference to the drawings. FIG. 21 is a vertical cross-sectional view of the in-building storage apparatus in accordance with the third embodiment of the present invention. FIG. 22 is a horizontal cross-sectional view of the in-building storage apparatus illustrated in FIG. 21. FIG. 23 is a perspective view of the unit for bringing an automobile into or taking an automobile out of a storage space. FIG. 24 is a perspective view of a part of the platform car and the guide rail. FIG. 25 is a side view of the platform car. FIG. 26 is a perspective view of the lift unit. FIG. 27 is a block diagram of the control unit. Parts or elements illustrated in FIGS. 21 to 27 that have the same structure as that of the in-building storage apparatuses 1 and 1x in accordance with the first and second embodiments have been provided with the same reference numerals, and explanation of them is omitted.

As illustrated in FIGS. 21 and 22, an in-building storage apparatus 1y is comprised as a parking area equipment for a multistoried condominium.

The in-building storage apparatus 1y includes a horizontally moving unit 6 arranged at an entrance/exit of a building, a guide rail 31y making sliding movement within a storage area, a platform car 32y moving along the guide rail 31y, suspenders 33 for suspending an automobile, a lift unit 4y located at a deep side of the storage space, and a control unit 5y entirely controlling the in-building storage apparatus 1y.

As illustrated in FIG. 23, the horizontally moving unit 6 takes an automobile into or takes an automobile out of a building. The horizontally moving unit 6 includes a substantially U-shaped main frame 61 for loading thereon a parking plate 13 on which an automobile is to be loaded, wheels 62 fixed at a lower surface of the main frame 61, a driver section (not illustrated) for driving the wheels 62, and rails 63 on which the wheels 62 run. The horizontally moving unit 6 is mounted at a dug portion of a ground at an entrance/exit of a building such that the parking plate 13 on which an automobile is to be loaded has the same height as a ground level.

The main frame 61 includes an upper frame 611 on which the parking plate 13 is loaded, a lower frame 612 to which the wheels 62 are fixed, and supports 613 fixed onto the lower frame 612 for supporting the upper frame 611.

As illustrated in FIGS. 24 and 25, the guide rail 31y includes a pair of main rails 310 each having a substantially triangular cross-section and spaced away from and in parallel with each other by a distance almost equal to a length of an automobile, and a connection frame 311 spacing the main rails 310 from each other by a predetermined distance. Both the main rails 310 and the connection frame 311 are rigid enough to load and support both the parking plate 13 and an automobile thereon.

The main rails 310 are formed at opposite ends thereof with a wheel 312 for running on the travel path 313 to allow the guide rail 31y to make sliding movement. The wheel 312 includes totally four wheels, specifically, a pair of drive wheels 312a formed at one of the main rails 310, and a pair of driven wheels 312b formed at the other of the main rails 310.

A mechanism for driving the drive wheels 312a is identical to the same in the guide rail 31x having been mentioned in the second embodiment, and hence, the explanation thereof is omitted.

The wheels 312 of the guide rail 31y run on the travel path 313 to thereby cause the guide rail to make sliding movement in a direction perpendicular to a longitudinal direction of the main rails 310.

The platform car 32y includes a main frame 321y formed rectangular when vertically viewed, and an elevating/lowering base 322y formed above the main frame 321y.

Five hydraulic cylinders 323y which are controlled to extend or contract by means of the control unit 5y are sandwiched between the main frame 321y and the elevating/lowering base 322y at four corners and a central point. The main frame 321y has wheels 3211a driven by a drive motor (not illustrated). Though the elevating/lowering base 322y is elevated or lowered by the hydraulic cylinders 323y, there may be used a pantograph system in place of the hydraulic cylinders.

As illustrated in FIGS. 21 and 22, the suspenders 33 are identical in structure with those of the first embodiment except that they are rigid enough to hold an automobile, and are designed to hold and suspend the parking plate 13 on which an automobile is loaded, at opposite ends thereof.

Below the suspenders 33, there is formed a space S in which the platform car 32y moving on the guide rail 31y which makes sliding movement is able to pass. Even when the parking plate 13 on which an automobile is loaded is suspended by the suspenders 33, the platform car 32y is able to pass in the space S.

As illustrated in FIG. 26, the lift unit 4y carries an automobile from a lower story to an upper story and vice versa, specifically, the U-shaped stage 41 elevates or lowers along an elevation rail 43c to thereby cause the parking plate 13 on which an automobile is loaded to elevate or lower. In order for the stage 41 to be able to elevate or lower with an automobile loaded thereon, the lift unit 4y is designed to additionally include a mechanism for elevating or lowering a front end of the stage 41, in comparison with the lift unit 4 mentioned in the first embodiment.

Two support pillars 426 stand on the stage 41 at a front end. A chain 427 is connected to an end of each of the support pillars 426. The chains 427 are wound up by means of first chain wheels 429 which rotate by a shaft 428 located above the support pillars 426, and second chain wheels 430 which rotate by a shaft 423.

The shaft 428 is rotated by a driven sprocket 431 which rotates through a chain 432 through which a drive force is transferred from a drive gear 424.

As illustrated in FIG. 27, the control unit 5y includes display means 51y, input means 52y, storage administration means 53y, means 54y for identifying a location of an article, means 55y for administrating a current location, and means 56y for controlling carriage.

The display means 51y is comprised of a liquid crystal panel displaying a story number input thereto, a position number of an automobile, and a status of taking an automobile into and/or taking an automobile out of the in-building storage apparatus. The input means 52y is comprised of a key pad through which a story number and a position number is input, and which has numeral keys and functional keys for making an instruction of taking an automobile into and/or taking an automobile out of the in-building storage apparatus.

The storage administration means 53y has a function of checking whether an automobile is loaded at a predetermined position in the suspenders 33.

The means 54y for identifying a location of an article has a function of determining a location of an automobile in accordance with the input story number and automobile number.

The means 55y for administrating a current location has a function of memorizing a current position of the platform car 32y.

The means 56y for controlling carriage has a function of displaying, for the sake of confirmation, a story number and a position number input through the input means 52y, and controlling the horizontally moving unit 6, the guide rail 31y, the platform car 32y and the lift unit 4y in accordance with a story number, a position number, and an input instruction of taking an automobile into and/or taking an automobile out of the in-building storage apparatus.

Figure 28:
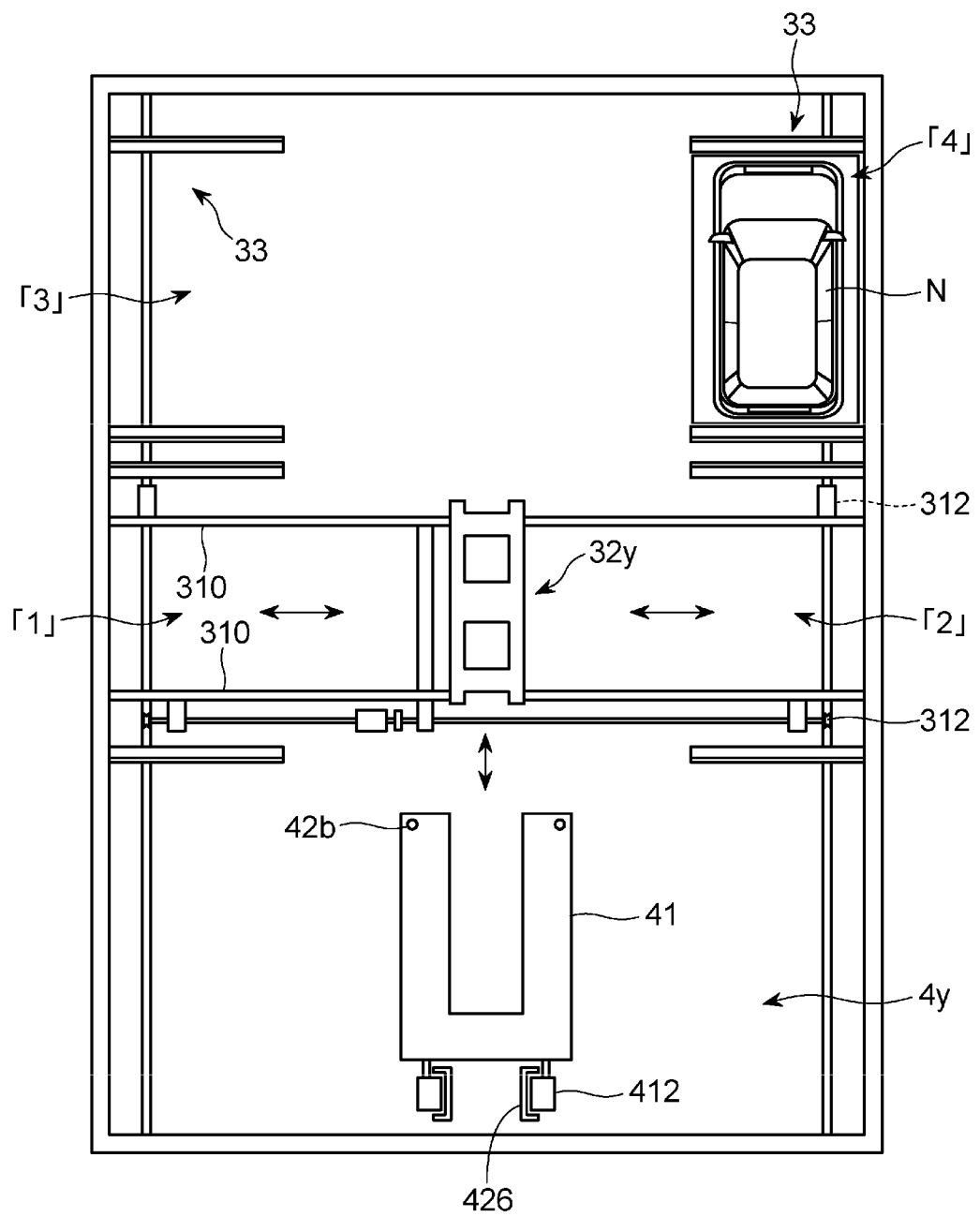
FIG. 28 is a horizontal cross-sectional view of a second story of the in-building storage apparatus illustrated in FIG. 21.

The operation of the in-building storage apparatus 1y in accordance with the third embodiment, having such a structure as mentioned above, is explained hereinbelow additionally with reference to FIG. 28. FIG. 28 is a horizontal cross-sectional view of a second story of the in-building storage apparatus 1y.

In the third embodiment, there is explained a case that an automobile N parking on a second story, as illustrated in FIG. 28, is to be taken out. As illustrated in FIG. 28, numbers "1" to "4" are assigned as mobile positions from a deeper side.

First, a resident pushes a key "2" indicative of a second story, a key "4" indicative of an automobile number, and then, a key "out" through the input means 52y. The carriage controlling means 56y displays the input information in the display means 51y, and causes the storage administration means 53y to check whether an automobile parks at the position "4" in a second story. Confirming that the automobile N is parking, the carriage controlling means 56y outputs both an information "2" indicative of a story number and an information "4" indicative a position number to the means 54y for identifying a location of an article, and receives an information as to a storage position of a second story in which the automobile N is parking, from the means 54y for identifying a location of an article.

In accordance with both an information about a storage position, received from the means 54y for identifying a location of an article, and an information indicative of a current position of the platform car 32y, received from the means 55y for administrating a current location, the carriage controlling means 56y causes the platform car 32y to move along the guide rail 31y from the current position thereof to a storage position at which the automobile N to be taken out is stored, with the guide rail 31y being caused to make sliding movement.

The carriage controlling means 56y causes the platform car 32y to linearly move by causing the platform car 32y to move towards a position located below the automobile N while the guide rail 31y is caused to make sliding movement. Since the suspenders 33 are located at lower ends thereof at such a height that the platform car 32y is able to pass below the suspenders together with the guide rail 31y, the platform car 32y can be moved to a position located below the automobile N without making collision with the suspenders 33. Thus, it is possible to move the platform car 32y at a minimum distance to a target position from an initial position.

When the platform car 32y arrived at a position located below the automobile N, the carriage controlling means 56y controls the hydraulic cylinders 323y to elevate the elevating/lowering base 322y to thereby cause the parking plate 13 on which the automobile N is parking to float above the suspenders 33.

The carriage controlling means 56y causes the platform car 32y to retreat along the guide rail 31y. Then, the carriage controlling means 56y causes the guide rail 31y to make sliding movement into the stage 41 of the lift unit 4y with the automobile N being loaded on the platform car 32y and the elevating/lowering base 322y being kept elevated.

When the platform car 32y retreats from the suspenders 33 and moves towards the lift unit 4y, the platform car 32y has to turn perpendicularly. Since the platform car 32y in the third embodiment moves in a direction perpendicular to a direction in which the guide rail 31y make sliding movement, the platform car 32y is able to readily perpendicularly turn by causing the guide rail 31y to make sliding movement after the platform car 32y moved.

The carriage controlling means 56y lowers the elevating/lowering base 322y of the platform car 32y, and delivers the parking plate 13 located above the elevating/lowering base 322y together with the automobile N to the stage 41, and thereafter, causes the guide rail 31y to make sliding movement to retreat the platform car 32y.

The carriage controlling means 56y controls the drive motor 425 of the lift unit 4y to thereby lower the stage 41 on which the automobile N is loaded to a first story from a second story.

After the stage 41 moved to a first story from a second story, the carriage controlling means 56y causes the guide rail 31y arranged in a first story to move to a position located below the lift unit 4y for delivering the platform car 32y with the elevating/lowering base 322y having been lowered into the stage 41.

The carriage controlling means 56y elevates the elevating/lowering base 322y to thereby elevate the parking plate 13 together with the automobile N, and thus, the parking plate 13 is caused to float above the stage 41.

The carriage controlling means 56y causes the guide rail 31y to make sliding movement towards the horizontally moving unit 6, and causes the platform car 32y with the elevating/ lowering base 322y having been elevated to move into the main frame 61 of the horizontally moving unit 6.

The carriage controlling means 56y lowers the elevating/lowering base 322y to thereby deliver the parking plate 13 located above the elevating/lowering base 322y together with the automobile N to the upper frame 611 of the horizontally moving unit 6.

The carriage controlling means 56y causes the horizontally moving unit 6 to go along the rails 63 outside the building, and thus, the automobile N is delivered to a resident.

In such a way as mentioned above, a resident can receive the automobile which has parked in a second story. The automobile can be taken into the building in accordance with the steps just opposite to the steps for taking the automobile out of the building.

In the in-building storage apparatus 1y in accordance with the third embodiment, similarly to the first and second embodiments, the platform car 32y which moves along the guide rail 31y which makes sliding movement is able to carry an automobile, even if it were big-sized and heavy as an article, and turn perpendicularly, move linearly obliquely, and, if necessary, move in a step-like or arcuate route. Thus, even though the guide rail 31y and the platform car 32y were simple in structure, specifically, the wheels 312 of the guide rail and the wheels 3211a of the platform car 32y were not able to turn, it would be possible for the guide rail 31y and the platform car 32y to move in any directions.

Furthermore, since the in-building storage apparatus 1y includes the lift unit 4y, it is possible to use a plurality of adjacent stories as a parking area or use an attic of each of rooms as a parking area.

In the third embodiment, it is possible to park four automobiles on each story. However, it is possible to park additionally two automobiles by arranging the suspenders 33 on opposite walls sandwiching the lift unit 4y therebetween. When those two automobiles are taken into or taken out of the in-building storage apparatus, an automobile being carried and the stage 41 do not interfere with each other by keeping the stage 41 of the lift unit 4y elevated.

Though the in-building storage apparatus 1y in accordance with the third embodiment is applied to a multistoried condominium, the in-building storage apparatus 1y may be applied to commercial facilities such as a department store, a supermarket and a shopping mall. As an alternative, the in-building storage apparatus 1y may be installed in a building built as a three-dimensional parking area.

Though the in-building storage apparatus 1y in accordance with the third embodiment is designed to include a pair of the guide rail 31y and the platform car 32y on each story, a combination of a plurality of guide rails 31x and a plurality of the platform cars 32x may be used in a big-sized parking area, similarly to the second embodiment.

INDUSTRIAL APPLICABILITY

The in-building storage apparatus in accordance with the present invention may be installed in an attic or in an underfloor, that is, the in-building storage apparatus may be preferably used as an attic storage apparatus or an underfloor storage apparatus both of which effectively make use of a limited space.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The invention claimed is:

1. An in-building storage apparatus comprising:
   a guide rail mounted in a storage space for storing articles, said guide rail having main rails and being configured to slide in a direction perpendicular to a longitudinal axis of said main rails;
   a platform car including:
      a traveling section for allowing said platform car to move along the longitudinal axis of said main rails of said guide rail; and
      a lifting/lowering section for lifting and lowering the articles;
   suspenders configured to each suspend a respective one of the articles at a height to allow said platform car to pass below the articles held by said suspenders; and
   a control unit configured to:
      cause said guide rail to slide in the direction perpendicular to the longitudinal axis of said main rails;
      cause said platform car to move along the longitudinal axis of said main rails of said guide rail;
      cause said lifting/lowering section to lift and lower the articles so as to remove a target one of the articles out of a respective one of said suspenders, and so as to place the target one of the articles into an empty one of said suspenders so as to suspend the target one of the articles;
      when said platform car is unloaded, cause said guide rail to slide in the direction perpendicular to the longitudinal axis of said main rails so that said platform car moves linearly in at least one of a first area in which suspenders are located and a second area in which said suspenders are not located from an initial position to a target position, remove the target one of the articles located at the target position out of a respective one of said suspenders, and load the target one of the articles onto said platform car; and
      when said platform car is loaded, cause said platform car to move only in the second area in which said suspenders are not located.

2. The in-building storage apparatus as set forth in claim 1, wherein said suspenders are arranged in a plurality of rows to define paths, said platform car being configured to travel along said paths between adjacent rows of said suspenders when said platform car is loaded with one of the articles being mounted on said lifting/lowering section.

3. The in-building storage apparatus as set forth in claim 1, wherein each of said suspenders includes a pair of vertical sections spaced apart from each other by a distance greater than a maximum width of one of the articles, each of said suspenders further including holding sections formed with said vertical sections so as to extend inwardly and so as to be spaced apart from holding sections of an adjacent one of said suspenders by a distance shorter than the maximum width of the one of the articles so as to hold the one of the articles.

4. The in-building storage apparatus as set forth in claim 1, further comprising a lift unit including:
   a pair of horizontal sections spaced apart from each other by a distance sized to allow one of the articles mounted on said platform car to be inserted between said horizontal sections so as to hold the one of the articles thereon; and
   a lift section for lifting and lowering said horizontal sections so as to carry the one of the articles to an entrance/exit.

5. The in-building storage apparatus as set forth in claim 1, wherein said guide rail is a first guide rail, further comprising a second guide rail configured to slide relative to said first guide rail so as to form a line with said first guide rail;

wherein said control unit is configured to cause at least one of said first guide rail and said second guide rail to slide to allow said platform car to run between said first guide rail and said second guide rail arranged to form the line.

6. The in-building storage apparatus as set forth in claim 5, further comprising a relay rail for connecting said first guide rail and said second guide rail to allow both said first guide rail and said second guide rail to slide toward each other to define a linear rail on which said platform car will travel.

7. The in-building storage apparatus as set forth in claim 6, wherein said control unit is configured to cause at least three guide rails including said first guide rail and said second guide rail to slide in parallel with one another to form a line, and said control unit being configured to cause said platform car to travel from a first one of said at least three guide rails at a first end to a second one of said at least three guide rails at a second end.

8. The in-building storage apparatus as set forth in claim 5, wherein said control unit is configured to cause at least three guide rails including said first guide rail and said second guide rail to slide in parallel with one another to form a line, and said control unit being configured to cause said platform car to travel from a first one of said at least three guide rails at a first end to a second one of said at least three guide rails at a second end.

9. A method of removing an article from an in-building storage apparatus including a guide rail, a platform car, and suspenders for suspending articles, wherein each of the suspenders suspends one of the articles at a height such that the platform car unloaded with articles can pass below the articles, the guide rail being disposed below a storage space in which the suspenders are disposed, and the guide rail being configured to slide in a direction perpendicular to a longitudinal axis of main rails of the guide rail, the platform car including a traveling section configured to allow the platform car to run on the guide rail, and the platform car including a lifting/lowering section for lifting and lowering an article, said method comprising:

causing the platform car unloaded with articles to linearly move from an initial position through a first area in which the suspenders are located and a second area in which the suspenders are not located to a target position located in the first area in which the suspenders are located;

lifting the platform car to remove one of the articles located at the target position from the suspenders, and loading the one of the articles onto the platform car; and moving the platform car loaded with the one of the articles only in the second area in which the suspenders are not located.

10. The method of removing an article as set forth in claim 9, wherein said moving of the platform car loaded with the one of the articles comprises moving the platform car to an exit.

* * * * *